US012776283B2

(12) United States Patent
Yang

(10) Patent No.: US 12,776,283 B2
(45) Date of Patent: Oct. 27, 2026

(54) DISPLAY DEVICE, ELECTRONIC DEVICE INCLUDING THE SAME, AND METHOD OF DRIVING THE SAME

(71) Applicant: Samsung Display Co., LTD., Yongin-si (KR)

(72) Inventor: Su Min Yang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/214,248

(22) Filed: May 21, 2025

(65) Prior Publication Data

US 2025/0378797 A1 Dec. 11, 2025

(30) Foreign Application Priority Data

Jun. 5, 2024 (KR) ........................ 10-2024-0073555

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2300/0842* (2013.01); *G09G 2310/0275* (2013.01); *G09G 2310/08* (2013.01); *G09G 2320/041* (2013.01); *G09G 2320/043* (2013.01); *G09G 2330/021* (2013.01)

(58) Field of Classification Search
CPC ...... G09G 3/32; G09G 3/3233; G09G 3/3275; G09G 3/3291; G09G 2300/0439; G09G 2300/0842; G09G 2310/0275; G09G 2310/08; G09G 2320/041; G09G 2320/043; G09G 2330/021; H10K 59/353
See application file for complete search history.

(56) References Cited

U.S. PATENT DOCUMENTS

| | | | | |
|---|---|---|---|---|
| 8,654,155 | B2 | 2/2014 | Yu et al. | |
| 9,805,646 | B2 | 10/2017 | Park | |
| 10,964,273 | B2 | 3/2021 | Oh et al. | |
| 11,727,863 | B2 | 8/2023 | An et al. | |
| 2019/0043421 | A1 * | 2/2019 | Yang | G09G 3/3291 |
| 2020/0143739 | A1 * | 5/2020 | Yang | G09G 3/3225 |

FOREIGN PATENT DOCUMENTS

| | | | | |
|---|---|---|---|---|
| CA | 2354018 | A1 * | 6/2000 | G09G 5/399 |
| KR | 101351405 | B1 | 1/2014 | |
| KR | 102342086 | B1 | 12/2021 | |
| KR | 102460542 | B1 | 10/2022 | |
| KR | 1020230025596 | A | 2/2023 | |
| KR | 102559092 | B1 | 7/2023 | |

* cited by examiner

*Primary Examiner* — Julie Anne Watko
(74) *Attorney, Agent, or Firm* — CANTOR COLBURN LLP

(57) ABSTRACT

A display device includes: a display panel where a plurality of sub-pixels and a plurality of reference voltage lines connected to the plurality of sub-pixels are disposed, a data driving circuit connected to the plurality of reference voltage lines, for sensing a first sub-pixel among the plurality of sub-pixels in a first period, and for sensing a second sub-pixel among the plurality of sub-pixels in a second period after the first period, and a timing controller for correcting a sensing value obtained by sensing the first sub-pixel based on a sensing value obtained by sensing the second sub-pixel.

9 Claims, 21 Drawing Sheets

FIG. 11

1100

| SENSING PERIOD (1110) | SENSING OBJECT (1120) | ROW (1130) | COLUMN (1140) | SENSING VALUE(Dsen) (1150) | AVERAGE VALUE FOR EACH ROW (1160) |
|---|---|---|---|---|---|
| PR1 | RED SUB-PIXEL POSITIONED IN ODD COLUMN | FIRST ROW | FIRST COLUMN | Dsen_r_1_1 | AVGr_odd_1 |
| | | | THIRD COLUMN | Dsen_r_1_3 | |
| | | | ⋮ | ⋮ | |
| | | | (n-1)-TH COLUMN | Dsen_r_1_n-1 | |
| | | SECOND ROW | FIRST COLUMN | Dsen_r_2_1 | AVGr_odd_2 |
| | | | THIRD COLUMN | Dsen_r_2_3 | |
| | | | ⋮ | ⋮ | |
| | | | (n-1)-TH COLUMN | Dsen_r_2_n-1 | |
| | | ⋮ | ⋮ | ⋮ | ⋮ |

FIG. 12

1200

1210 1220 1230 1240

| SENSING PERIOD | SENSING OBJECT | AVERAGE VALUE FOR EACH ROW | | AVERAGE VALUE FOR EACH PERIOD |
|---|---|---|---|---|
| PR1 | RED SUB-PIXEL POSITIONED IN ODD COLUMN | FIRST ROW | AVGr_odd_1 | AVGr_odd |
| | | SECOND ROW | AVGr_odd_2 | |
| | | ⋮ | ⋮ | |
| | | m-TH ROW | AVGr_odd_m | |
| PR2 | GREEN SUB-PIXEL POSITIONED IN ODD COLUMN | FIRST ROW | AVGg_odd_1 | AVGg_odd |
| | | SECOND ROW | AVGg_odd_2 | |
| | | ⋮ | ⋮ | |
| | | m-TH ROW | AVGg_odd_m | |
| PR3 | BLUE SUB-PIXEL POSITIONED IN ODD COLUMN | FIRST ROW | AVGb_odd_1 | AVGb_odd |
| | | SECOND ROW | AVGb_odd_2 | |
| | | ⋮ | ⋮ | |
| | | m-TH ROW | AVGb_odd_m | |
| PR4 | RED SUB-PIXEL POSITIONED IN EVEN COLUMN | FIRST ROW | AVGr_even_1 | AVGr_even |
| | | SECOND ROW | AVGr_even_2 | |
| | | ⋮ | ⋮ | |
| | | m-TH ROW | AVGr_even_m | |
| PR5 | GREEN SUB-PIXEL POSITIONED IN EVEN COLUMN | FIRST ROW | AVGg_even_1 | AVGg_even |
| | | SECOND ROW | AVGg_even_2 | |
| | | ⋮ | ⋮ | |
| | | m-TH ROW | AVGg_even_m | |
| PR6 | BLUE SUB-PIXEL POSITIONED IN EVEN COLUMN | FIRST ROW | AVGb_even_1 | AVGb_even |
| | | SECOND ROW | AVGb_even_2 | |
| | | ⋮ | ⋮ | |
| | | m-TH ROW | AVGb_even_m | |

FIG. 13

1300

| 1310 SENSING PERIOD | 1320 SENSING OBJECT | 1330 ROW | 1340 COLUMN | 1350 SENSING VALUE (Dsen) | 1360 AVERAGE VALUE FOR EACH ROW | 1370 NORMALIZATION CONSTANT FOR EACH ROW | 1380 CORRECTION SENSING VALUE(Dsen_revised) | 1390 CORRECTION AVERAGE VALUE FOR EACH ROW | 1395 CORRECTION AVERAGE VALUE FOR EACH PERIOD |
|---|---|---|---|---|---|---|---|---|---|
| PR1 | RED SUB-PIXEL POSITIONED IN ODD COLUMN | FIRST ROW | FIRST COLUMN | Dsen_r_1_1 | AVGr_odd_1 | AVGr_odd_1-AVGr_even_1 | Dsen_r_1_1-(AVGr_odd_1-AVGr_even_1) | AVGr_even_1 | AVGr_even |
| | | | THIRD COLUMN | Dsen_r_1_3 | | | Dsen_r_1_3-(AVGr_odd_1- AVGr_even_1) | | |
| | | | ⋮ | ⋮ | | | ⋮ | | |
| | | | (n-1)-TH COLUMN | Dsen_r_1_n-1 | | | Dsen_r_1_n-1-(AVGr_odd_1-AVGr_even_1) | | |
| | | SECOND ROW | FIRST COLUMN | Dsen_r_2_1 | AVGr_odd_2 | AVGr_odd_2-AVGr_even_2 | Dsen_r_2_1-(AVGr_odd_2-AVGr_even_2) | AVGr_even_2 | |
| | | | THIRD COLUMN | Dsen_r_2_3 | | | Dsen_r_2_3-(AVGr_odd_2-AVGr_even_2) | | |
| | | | ⋮ | ⋮ | | | ⋮ | | |
| | | | (n-1)-TH COLUMN | Dsen_r_2_n-1 | | | Dsen_r_2_n-1-(AVGr_odd_2-AVGr_even_2) | | |
| | | ⋮ | ⋮ | ⋮ | ⋮ | ⋮ | ⋮ | ⋮ | |

FIG. 17

1700

| SENSING PERIOD (1710) | SENSING OBJECT (1720) | ROW (1730) | COLUMN (1740) | SENSING VALUE (Dsen) (1750) | AVERAGE VALUE FOR EACH ROW (1760) | NORMALIZATION CONSTANT FOR EACH ROW (1770) | CORRECTION SENSING VALUE(Dsen_revised) (1780) | CORRECTION AVERAGE VALUE FOR EACH ROW (1790) | CORRECTION AVERAGE VALUE FOR EACH PERIOD (1795) |
|---|---|---|---|---|---|---|---|---|---|
| PR1 | RED SUB-PIXEL POSITIONED IN ODD COLUMN | FIRST ROW | FIRST COLUMN | Dsen_r_1_1 | AVGr_odd_1 | AVGr_odd_1-AVGr_pre_1 | Dsen_r_1_1-(AVGr_odd_1-AVGr_pre_1) | AVGr_pre_1 | AVGr_pre |
| | | | THIRD COLUMN | Dsen_r_1_3 | | | Dsen_r_1_3-(AVGr_odd_1- AVGr_pre_1) | | |
| | | | ⋮ | ⋮ | | | ⋮ | | |
| | | | (n-1)-TH COLUMN | Dsen_r_1_n-1 | | | Dsen_r_1_n-1-(AVGr_odd_1-AVGr_pre_1) | | |
| | | SECOND ROW | FIRST COLUMN | Dsen_r_2_1 | AVGr_odd_2 | AVGr_odd_2-AVGr_pre_2 | Dsen_r_2_1-(AVGr_odd_2-AVGr_pre_2) | AVGr_pre_2 | |
| | | | THIRD COLUMN | Dsen_r_2_3 | | | Dsen_r_2_3-(AVGr_odd_2-AVGr_pre_2) | | |
| | | | ⋮ | ⋮ | | | ⋮ | | |
| | | | (n-1)-TH COLUMN | Dsen_r_2_n-1 | | | Dsen_r_2_n-1-(AVGr_odd_2-AVGr_pre_2) | | |
| | | ⋮ | ⋮ | ⋮ | ⋮ | ⋮ | ⋮ | ⋮ | |

DISPLAY DEVICE, ELECTRONIC DEVICE INCLUDING THE SAME, AND METHOD OF DRIVING THE SAME

This application claims priority to Korean Patent Application No. 10-2024-0073555, filed on Jun. 5, 2024, and all the benefits accruing therefrom under 35 U.S.C. § 119, the content of which in its entirety is herein incorporated by reference.

BACKGROUND

1. Field

Embodiments of the disclosure relate to a display device, an electronic device including the same, and a method of driving the same.

2. Description of the Related Art

As information technology develops, importance of a display device which is a connection medium between a user and information is being highlighted. In response to this, a use of the display device such as a liquid crystal display device ("LCD") and an organic light emitting display device is increasing.

For example, an organic light emitting display device may implement various luminances by adjusting a size of a current flowing through a light emitting element. However, when a circuit element configuring the display device is deteriorated, a characteristic value of the circuit element (for example, a threshold voltage of a transistor or the like) may be changed. By compensating for the change in the characteristic value of the circuit element, display quality may be improved.

Meanwhile, a temperature of the display device may change during a period of sensing the circuit element to compensate for the change in the characteristic value of the circuit element. The temperature change may cause reduction of reliability of sensing and compensation. Therefore, a method capable of reducing an effect of sensing and compensation due to the temperature change.

SUMMARY

A technical aspect to be solved is to provide a display device capable of improving reliability by reducing an effect of sensing and compensation due to a temperature change, an electronic device including the same, and a method of driving the same.

Embodiments of the disclosure may provide a display device. The display device includes a display panel where a plurality of sub-pixels and a plurality of reference voltage lines connected to the plurality of sub-pixels are disposed, a data driving circuit connected to the plurality of reference voltage lines, for sensing a first sub-pixel among the plurality of sub-pixels in a first period, and for sensing a second sub-pixel among the plurality of sub-pixels in a second period after the first period, and a timing controller for correcting a sensing value obtained by sensing the first sub-pixel based on a sensing value obtained by sensing the second sub-pixel.

A temperature of the display panel at a time point when the second sub-pixel is sensed may be lower than a temperature of the display panel at a time point when the first sub-pixel is sensed.

The first sub-pixel may be positioned in a first column, the second sub-pixel may be positioned in a second column different from the first column, and the first sub-pixel and the second sub-pixel may be included in a plurality of first color sub-pixels, and may be positioned in the same row.

The first column may be included in odd columns and the second column may be included in even columns. The timing controller may calculate first average sensing values for respective rows based on first sensing values of first color sub-pixels positioned in the odd columns among the plurality of first color sub-pixels, and calculate second average sensing values for respective rows based on second sensing values of first color sub-pixels positioned in the even columns among the plurality of first color sub-pixels.

The timing controller may correct the first sensing values based on the second sensing values.

The timing controller may calculate normalization constants for respective rows, where the normalization constant for each row corresponds to a difference between the first average sensing value for each row and the second average sensing value for each row, and calculate correction sensing values obtained by correcting the first sensing values based on the calculated normalization constants.

The timing controller may generate a compensation value based on the correction sensing values and the second sensing values.

A plurality of data lines connected to the plurality of sub-pixels may be disposed in the display panel. At least one of the plurality of sub-pixels may include a light emitting element, a first transistor including a gate electrode electrically connected to a first node and connected between a first power line and a second node, a second transistor including a gate electrode electrically connected to a first scan line and configured to switch an electrical connection between the first node and a corresponding one of the plurality of data lines, a third transistor including a gate electrode electrically connected to a second scan line and configured to switch an electrical connection between the second node and a corresponding one of the plurality of reference voltage lines, and a storage capacitor including one side electrode electrically connected to the first node and another side electrode electrically connected to the second node.

The data driving circuit may include an output circuit configured to supply a data voltage to the plurality of data lines, and a sensing circuit configured to receive an analog voltage from the plurality of reference voltage lines and convert the received analog voltage into a digital sensing value corresponding to the received analog voltage.

Embodiments of the disclosure may provide a display device. The display device includes a display panel where a plurality of sub-pixels and a plurality of reference voltage lines connected to the plurality of sub-pixels are disposed, a data driving circuit connected to the plurality of reference voltage lines, for sensing a first sub-pixel among the plurality of sub-pixels in a first period, and for sensing a second sub-pixel among the plurality of sub-pixels in a second period after the first period, and a timing controller for correcting a sensing value obtained by sensing the first sub-pixel and a sensing value obtained by sensing the second sub-pixel, based on an average sensing value for each row stored in advance.

The first sub-pixel may be positioned in a first column, the second sub-pixel may be positioned in a second column different from the first column, and the first sub-pixel and the second sub-pixel may be included in a plurality of first color sub-pixels and may be positioned in the same row.

The first column may be included in odd columns and the second column may be included in even columns. The timing controller may calculate first average sensing values for respective rows based on the first sensing values of first color sub-pixels positioned in the odd columns among the plurality of first color sub-pixels, and calculate second average sensing values for respective rows based on the second sensing values of first color sub-pixels positioned in the even columns among the plurality of first color sub-pixels.

The timing controller may correct each of the first sensing values and the second sensing values, based on the average sensing value for each row stored in advance.

The timing controller may calculate first normalization constants for respective rows, where the first normalization constant for each row corresponds to a difference between the first average sensing value for each row and the average sensing value for each row stored in advance, and calculate second normalization constants for respective rows, where the second normalization constant for each row corresponds to a difference between the second average sensing value for each row and the average sensing value for each row in advance.

The timing controller may calculate correction sensing values obtained by correcting the first and second sensing values, based on the calculated first and second normalization constants for respective rows, and generates a compensation value based on the correction sensing values.

Embodiments of the disclosure may provide a method of driving a display device including sensing and compensating for first color sub-pixels. Sensing and compensating for the first color sub-pixels may include calculating first sensing values of first color sub-pixels positioned in odd columns, calculating first average sensing values for respective rows based on the first calculated sensing values, calculating second sensing values of the first color sub-pixels positioned in even columns, calculating second average sensing values for respective rows based on the calculated second sensing values, calculating normalization constants for respective rows, where the normalization constant for each row corresponds to a difference between the first average sensing value for each row and the second average sensing value for each row, calculating correction sensing values obtained by correcting the first sensing values based on the calculated normalization constants, and generating a compensation value based on the calculated correction sensing values and the calculated second sensing values.

A correction average sensing value for each row corresponding to an average value of the correction sensing values may be the same as the second average sensing value for each row.

Calculating the correction sensing values may include subtracting a corresponding one of the normalization constants from each of the first sensing values. Each of the normalization constants may be calculated by subtracting the calculated second average sensing value for each row from the calculated first average sensing value for each row.

The method according to embodiments of the disclosure may further include sensing and compensating for second color sub-pixels, and sensing and compensating for third color sub-pixels. A temperature of the display device may be gradually decreased while sensing the first color sub-pixels, sensing the second color sub-pixels, and sensing the third color sub-pixels are sequentially performed.

Embodiments of the disclosure may provide an electronic device. The electronic device includes a display module including a display panel where a plurality of sub-pixels and a plurality of reference voltage lines connected to the plurality of sub-pixels are disposed, and a data driving circuit connected to the plurality of reference voltage lines, for sensing a first sub-pixel among the plurality of sub-pixels in a first period, and for sensing a second sub-pixel among the plurality of sub-pixels in a second period after the first period, a memory storing a lookup table in which sensing values obtained by sensing the plurality of sub-pixels in the first period and the second period are included, and a processor for correcting a value obtained by sensing the first sub-pixel based on a value obtained by sensing the second sub-pixel in the lookup table.

BRIEF DESCRIPTION OF THE DRAWINGS

The above and other features of the disclosure will become more apparent by describing in further detail embodiments thereof with reference to the accompanying drawings, in which:

FIG. 11 is a table illustrating an average sensing value for each row calculated in a first period;

FIG. 12 is a table illustrating an average sensing value for each row calculated in first to sixth periods;

FIG. 13 is a table illustrating a normalization constant for each row, a correction sensing value, a correction average sensing value for each row, and the like calculated in a first period in an embodiment;

FIG. 17 is a table illustrating a normalization constant for each row, a correction sensing value, a correction average sensing value for each row, and the like calculated in a first period in another embodiment;

DETAILED DESCRIPTION

Figure 1:
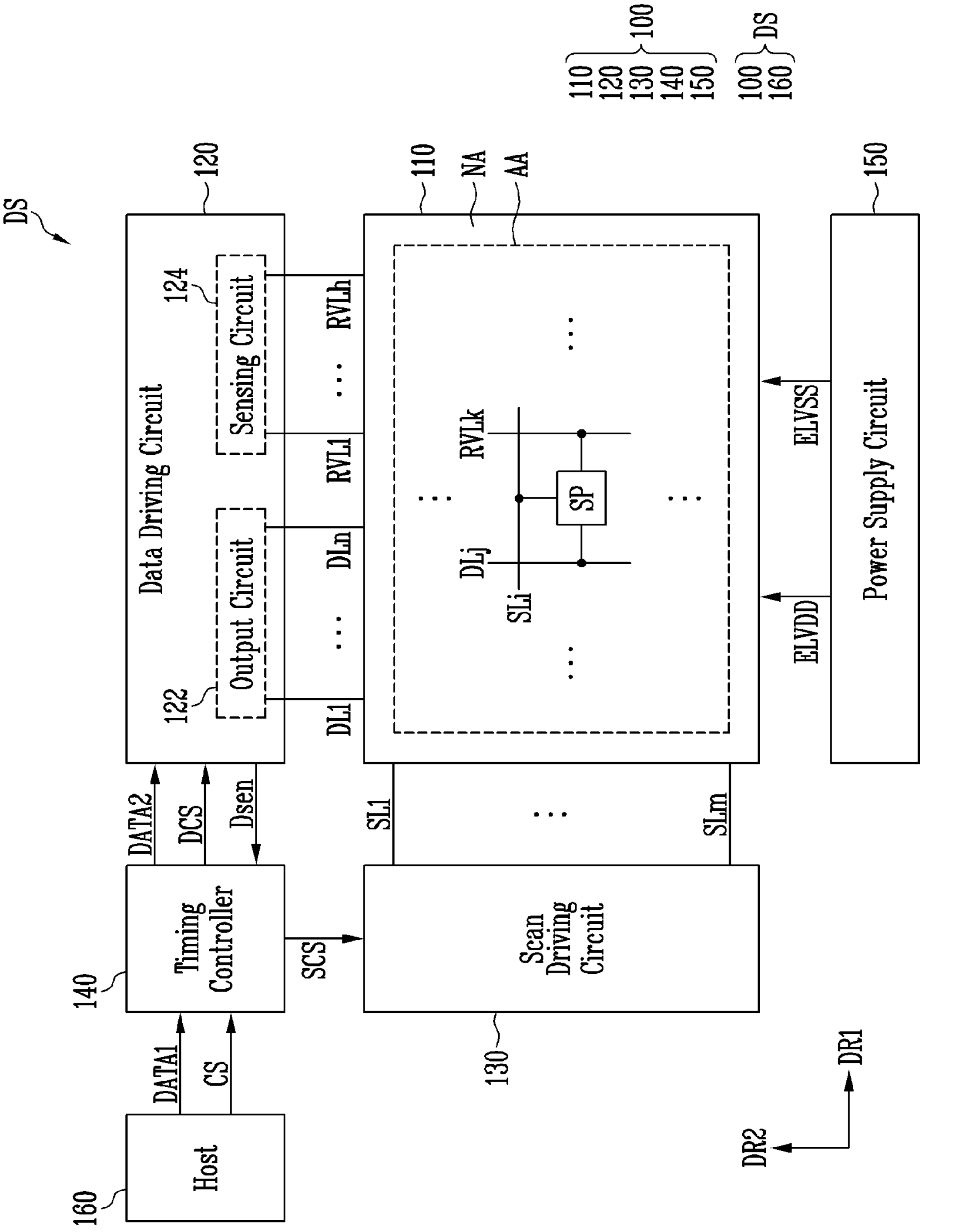
FIG. 1 is a system block diagram of a display device according to embodiments of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. The singular expressions include plural expressions unless the context clearly indicates otherwise.

Terms of "under", "below", "on", and "above" are used to describe an association of configurations shown in the drawings. The terms are described based on a direction indicated in the drawings as relative concepts.

Unless defined otherwise, all terms (including technical terms and scientific terms) used herein have the same meaning as a meaning generally understood by one of ordinary skill in the art to which the disclosure belongs. In addition, terms such as terms defined in a generally used dictionary are to be interpreted as having a meaning consistent with a meaning in a context of the related art, and are explicitly defined herein unless interpreted in an ideal or overly formal meaning.

It should be understood that a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance.

Hereinafter, embodiments of the disclosure are described in detail with reference to the accompanying drawings.

FIG. 1 is a system block diagram of a display device 100 according to embodiments of the disclosure.

Referring to FIG. 1, the display device 100 according to embodiments of the disclosure may include a display panel 110, a data driving circuit 120, a scan driving circuit 130, a timing controller 140, and a power supply circuit 150, and the like.

A plurality of sub-pixels SP are disposed in the display panel 110. In the display panel 110, a plurality of data lines DL1 to DLn (n is an integer of 2 or more), a plurality of scan lines SL1 to SLm (m is an integer of 2 or more), a plurality of reference voltage lines RVL1 to RVLh (h is an integer of 2 or more), and the like electrically connected to the plurality of sub-pixels SP may be disposed. In the display panel 110, one or more power lines configured to apply a power voltage (for example, a first power voltage ELVDD, a second power voltage ELVSS, and the like) to a plurality of sub-pixels SP may be disposed.

The display panel 110 may include a display area AA where the plurality of sub-pixels SP are disposed, and a non-display area NA positioned in a peripheral area of the display area AA (for example, an edge of the display area AA.

The display panel 110 may be formed flat, but embodiments of the disclosure are not limited thereto. For example, the display panel 110 may include a curved surface portion formed at left and right ends. A curved surface may have a constant curvature or a changing curvature. In addition, the display panel 110 may be flexible so as to be curved, warped, bent, folded, or rolled.

The plurality of sub-pixels SP may be disposed in a matrix type in the display area AA. According to an embodiment, the plurality of sub-pixels SP may be disposed in a PENTILE™ structure in the display area AA.

The plurality of data lines DL1 to DLn may extend in one direction in the display panel 110. For example, one direction may be a second direction DR2. The plurality of data lines DL1 to DLn may extend and may be disposed in the second direction DR2 (for example, overall in the second direction DR2) in the display panel 110. For example, the second direction DR2 may be a direction crossing from an upper side to a lower side of the display panel 110, but embodiments of the disclosure are not limited thereto.

The plurality of scan lines SL1 to SLm may extend in one direction on the display panel 110. For example, one direction may be a first direction DR1. The plurality of scan lines SL1 to SLm may extend and may be disposed in the first direction DR1 (for example, overall in the first direction DR1) in the display panel 110. The first direction DR1 may be a direction different from the second direction DR2, but embodiments of the disclosure are not limited thereto. For example, the first direction DR1 may be a direction crossing from a left side to a right side of the display panel 110.

The plurality of reference voltage lines RVL1 to RVLh may extend in one direction in the display panel 110. In an embodiment, the plurality of reference voltage lines RVL1 to RVLh may extend and may be disposed in the second direction DR2 (for example, overall in the second direction DR2). However, embodiments of the disclosure are not limited thereto.

The data driving circuit 120 may include an output circuit 122 and a sensing circuit 124. In an embodiment, the output circuit 122 and the sensing circuit 124 may be disposed to be functionally separate in the same integrated circuit. According to an embodiment, the output circuit 122 and the sensing circuit 124 may be respectively disposed in different integrated circuits.

The output circuit 122 may be configured to supply a data voltage to the plurality of data lines DL1 to DLn. The output circuit 122 may generate the data voltage based on second image data DATA2 and a data driving circuit control signal DCS, and output the generated data voltage to the plurality of data lines DL1 to DLn according to a timing. The data driving circuit control signal DCS may include, for example, a source start pulse ("SSP") signal, a source shift clock ("SSC") signal, and a source output enable ("SOE") signal, and the like.

The sensing circuit 124 is configured to input a reference voltage to the plurality of reference voltage lines RVL1 to RVLh in response to the data driving circuit control signal DCS and sense a voltage of the plurality of reference voltage lines RVL1 to RVLh. The sensing circuit 124 may convert a sensed analog voltage into a digital sensing value Dsen corresponding thereto. The sensing circuit 124 may include one or more analog-to-digital converters ("ADCs"). The data driving circuit control signal DCS may include, for example, a reference voltage switching signal, a sampling control signal, a hold control signal, and the like. A detailed description of the above-described signals is described later with reference to FIG. 4.

The data driving circuit 120 may be implemented as an integrated circuit (for example, a source driver integrated circuit SDIC) formed separately from the display panel 110. The data driving circuit 120 may be formed together with the display panel 110, and may be formed in at least a partial area on the non-display area NA of the display panel 110.

The scan driving circuit 130 is configured to output a scan signal to the plurality of scan lines SL1 to SLm in response to a scan driving circuit control signal SCS. The scan driving circuit control signal SCS may include a start signal indicating a start of a frame, a horizontal synchronization signal for outputting the scan signal according to a timing at which the data voltage is applied, and the like.

The scan driving circuit 130 may be implemented as an integrated circuit (for example, a gate driving integrated circuit GDIC) formed separately from the display panel 110. The scan driving circuit 130 may be formed together with the display panel 110, and may be formed in at least a partial area of the non-display area NA of the display panel 110.

The timing controller 140 may be configured to control the data driving circuit 120 and the scan driving circuit 130. The timing controller 140 may generate and output the control signals DCS and SCS for controlling the data driving circuit 120 and the scan driving circuit 130 based on a control signal (for example, a synchronization signal, a clock signal, a data enable signal, and the like) received through a host 160. According to an embodiment, the timing controller 140 may generate the synchronization signal, the data enable signal, and the like therein, based on the control signal (for example, information on a driving frequency (or a frame rate) of an image displayed on the display panel 110) received through the host 160.

The timing controller 140 may receive first image data DATA1 from the host 160 and align the input first image data DATA1 in a pixel row unit. The timing controller 140 may convert the input first image data DATA1 according to a preset interface (for example, low voltage differential signaling ("LVDS"), a display port ("DP"), an embedded display port ("eDP"), and the like). The second image data DATA2 output from the timing controller 140 to the data driving circuit 120 may be obtained by conversion inside the timing controller 140 according to the preset interface.

The timing controller may generate the second image data DATA2 based on the input first image data DATA1 and the sensing value Dsen. The second image data DATA2 may be obtained by compensation for a characteristic value change (for example, a change in a characteristic value due to deterioration of a circuit element, and the like) of the sub-pixel SP.

According to an embodiment, the timing controller 140 may be disposed in the display device 100 in a logic type. According to an embodiment, the timing controller 140 may be disposed in the display device 100 in a processor type. Timing controller 140 may include one or more memories (for example, a register, and the like).

The power supply circuit 150 may be configured to output a constant voltage of a constant voltage level. The power supply circuit 150 may output a power voltage (for example, a first power voltage ELVDD, a second power voltage ELVSS, and the like) supplied to the display panel 110. According to an embodiment, the power supply circuit 150 may output a voltage (for example, a gate high voltage, a gate low voltage, and the like) supplied to the scan driving circuit 130. According to an embodiment, the power supply circuit 150 may output a voltage (for example, a gamma voltage, a reference voltage, and the like) supplied to the data driving circuit 120. For example, the power supply circuit 150 may include a regulator (for example, a low dropout ("LDO") regulator, and the like. For example, the power supply circuit 150 may be implemented as a power management integrated circuit ("PMIC").

The host 160 may include a set-top box, an application processor (AP), and the like. In an embodiment, the host 160 may be a configuration external to the display device 100, which is not included in the display device 100. In an embodiment, the host 160 may be mounted in the display device 100. Transmission and reception of the first image data DATA1 and the control signal CS may be performed between the host 160 and the display device 100 through an interface. For example, the interface may be a serial programming interface ("SPI"), an inter integrated circuit ("I2C"), a mobile industry processor interface ("MIPI"), and the like. However, embodiments of the disclosure are not limited thereto.

An electronic device DS according to embodiments of the disclosure may include the display device 100 and the host 160.

In FIG. 1, circuits that supply a signal, a voltage, and the like to the display panel 110 are merely classified according to function. For example, the data driving circuit 120 and the timing controller 140 may be formed in one integrated circuit. The data driving circuit 120 and the timing controller 140 may be classified according to function in one integrated circuit in the display device 100.

The display device 100 according to embodiments of the disclosure may be used as a display screen of various products such as not only a mobile electronic device such as a mobile phone, a smart phone, a tablet personal computer ("PC"), a smart watch, a watch phone, a mobile communication terminal, an electronic notebook, an electronic book, a portable multimedia player ("PMP"), a navigation device, and an ultra-mobile personal computer ("UMPC"), but also a television, a notebook computer, a monitor, a billboard, and internet of things ("IoT").

Figure 2:
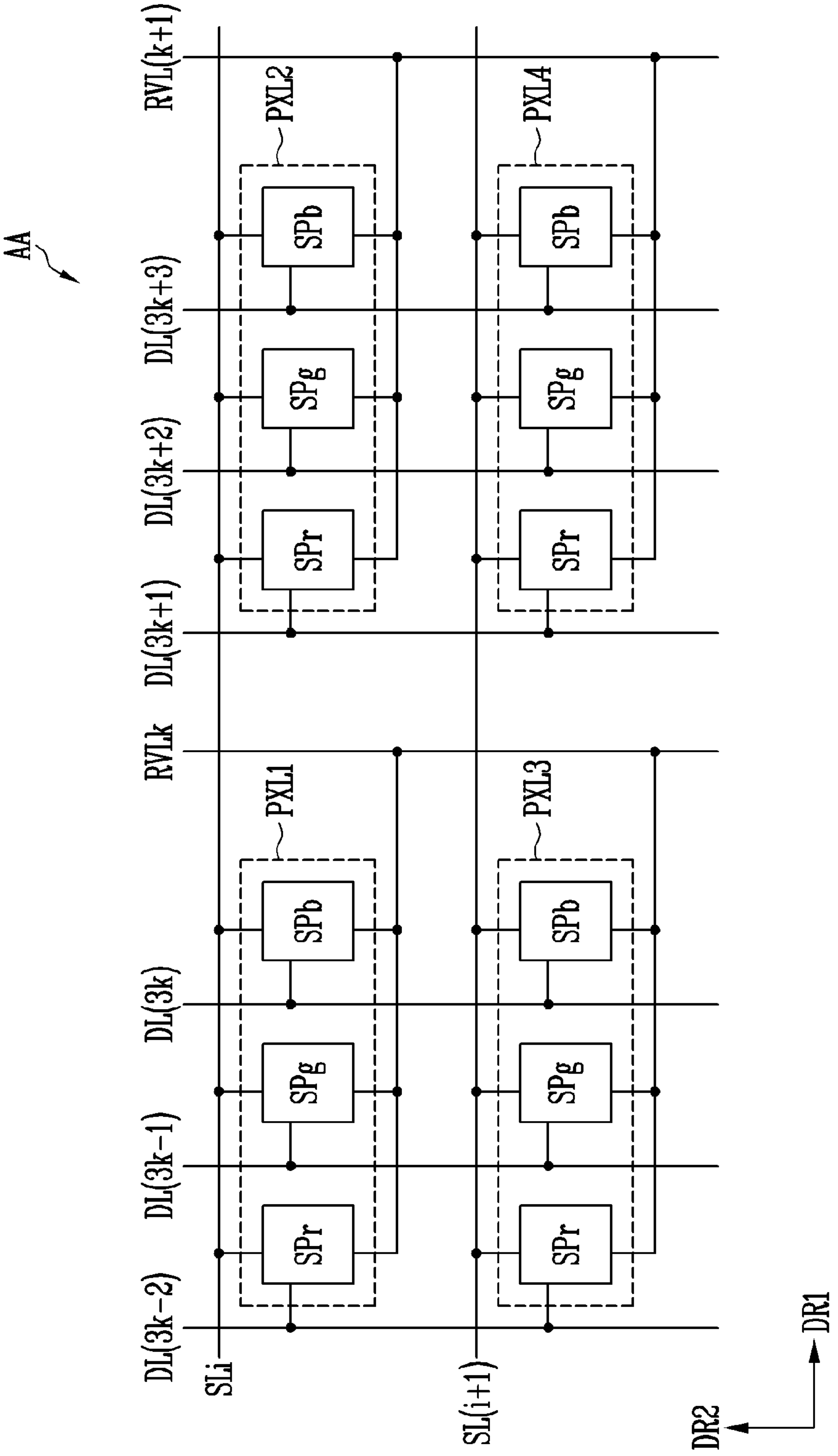
FIG. 2 is a conceptual diagram of a display area according to embodiments of the disclosure.

FIG. 2 is a conceptual diagram of the display area AA according to embodiments of the disclosure.

Referring to FIG. 2, a plurality of pixels (for example, first to fourth pixels PXL1, PXL2, PXL3, and PXLA; hereinafter also referred to as PXL1 to PXL4) disposed in a matrix type are exemplarily shown. Referring to FIG. 2, the four pixels PXL1 to PXL4 may be disposed adjacent to each other in a horizontal direction (or a row direction) or may be disposed adjacent to each other in a vertical direction (or a column direction).

One (for example, the first pixel PXL1 positioned at an upper left) of the four pixels PXL1 to PXLA may include a plurality of sub-pixels. In an embodiment, the first pixel PXL1 may include a first color sub-pixel, a second color sub-pixel, and a third color sub-pixel. In an embodiment, the first color sub-pixel may be a red sub-pixel SPr. The second color sub-pixel may be a green sub-pixel SPg. The third color sub-pixel may be a blue sub-pixel SPb. However, embodiments of the disclosure are not limited thereto. For example, the first pixel PXL1 may further include a white sub-pixel.

Below, for convenience of description, the display area AA is described based on the four pixels PXL1 to PXL4 disposed in two rows and two columns. In addition, an embodiment in which each of the four pixels PXL1 to PXL4 includes the red sub-pixel SPr, the green sub-pixel SPg, and the blue sub-pixel SPb is described as an example. However, embodiments of the disclosure are not limited thereto.

The three sub-pixels SPr, SPg, and SPb configuring one pixel (for example, the first pixel PXL1) may be configured to emit light of different wavelength bands, respectively. For example, the red sub-pixel SPr may be configured to emit light of a red wavelength band. For example, the green sub-pixel SPg may be configured to emit light of a green wavelength band. For example, the blue sub-pixel SPb may be configured to emit light of a blue wavelength band. According to an embodiment, one pixel may include two or more green sub-pixels SPg configured to emit green light.

The red wavelength band may be a wavelength band of about 600 nm (nanometers) to 750 nm. The green wavelength band may be about 480 nm to 560 nm. The blue wavelength band may be a wavelength band of about 370 nm to 460 nm.

In embodiments of the disclosure, each of the sub-pixels configuring one pixel may be electrically connected to a corresponding data line. For example, the red sub-pixel SPr, the green sub-pixel SPg, and the blue sub-pixel SPb of each of the first pixel PXL1 and the third pixel PXL3 may be electrically connected to three consecutive data lines DL(3k−2), DL(3k−1), and DL3*k* (k is an integer of 1 or more), respectively. For example, the red sub-pixel SPr, the green sub-pixel SPg, and the blue sub-pixel SPb of each of the second pixel PXL2 and the fourth pixel PXL4 may be electrically connected to three consecutive data lines DL(3k+1), DL(3k+2), and DL(3k+3), respectively.

In embodiments of the disclosure, the sub-pixels configuring one pixel may be electrically connected to one reference voltage line. For example, the red sub-pixel SPr, the green sub-pixel SPg, and the blue sub-pixel SPb of the first pixel PXL1 and the third pixel PXL3 may be electrically connected to a k-th reference voltage line RVLk (hereinafter, also referred to as a reference voltage line RVLk). For example, the red sub-pixel SPr, the green sub-pixel SPg, and the blue sub-pixel SPb of the second pixel PXL2 and the fourth pixel PXL4 may be electrically connected to a (k+1)-th reference voltage line RVL(k+1). However, embodiments of the disclosure are not limited thereto. For example, the red sub-pixel SPr, the green sub-pixel SPg, and the blue sub-pixel SPb configuring one pixel may be electrically connected to different reference voltage lines, respectively.

In embodiments of the disclosure, the sub-pixels configuring one pixel may be electrically connected to one scan line. For example, the red sub-pixel SPr, the green sub-pixel SPg, and the blue sub-pixel SPb of the first pixel PXL1 and the second pixel PXL2 may be electrically connected to an i-th scan line SLi (i is an integer of 1 or more). For example, the red sub-pixel SPr, the green sub-pixel SPg, and the blue sub-pixel SPb of the third pixel PXL3 and the fourth pixel PXLA may be electrically connected to an (i+1)-th scan line SL(i+1).

In embodiments of the disclosure, pixels electrically connected to the same scan line may be understood as being positioned in the same row. Referring to FIG. 2, the first pixel PXL1 and the second pixel PXL2 connected to the i-th scan line SLi may be understood as being positioned in the same row (for example, an i-th row). The third pixel PXL3 and the fourth pixel PXL4 connected to the (i+1)-th scan line SLi+1 may be understood as being positioned in the same row (for example, an (i+1)-th row).

In embodiments of the disclosure, pixels electrically connected to the same data lines may be understood as being positioned in the same column. Referring to FIG. 2, the first pixel PXL1 and the third pixel PXL3 connected to the (3k−2)-th data line DL3*k*-2, the (3k−1)-th data line DL3*k*−1, and the 3k-th data line DL3*k* may be understood as being positioned in the same column (or a k-th column). The second pixel PXL2 and the fourth pixel PXL4 connected to the (3k+1)-th data line DL3*k*+1, the (3k+2)-th data line DL3*k*+2, and (3k+3)-th data line DL3*k*+3 may be understood as being positioned in the same column (or a (k+1)-th column).

In embodiments of the disclosure, a plurality of pixels PXL may be disposed in two or more rows (or pixel rows) and two or more columns (or pixel columns) in the display area AA.

Figure 3:
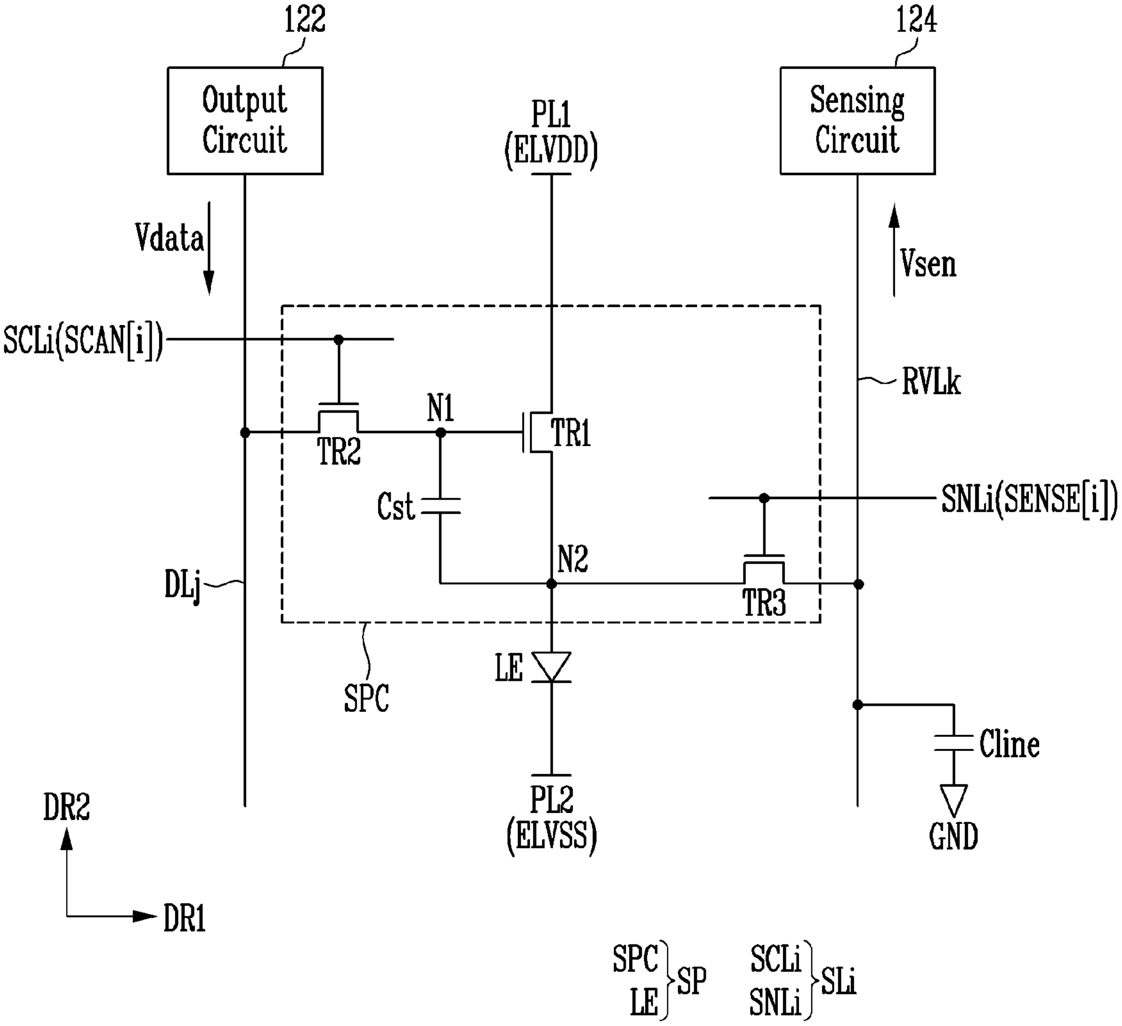
FIG. 3 is an equivalent circuit diagram of a sub-pixel according to embodiments of the disclosure.

FIG. 3 is an equivalent circuit diagram of a sub-pixel SP according to embodiments of the disclosure.

The sub-pixel SP according to embodiments of the disclosure may include a light emitting element LE and a pixel circuit SPC configured to supply a current (for example, a driving current) to the light emitting element LE. The pixel circuit SPC may include two or more switching elements (for example, transistors) and one or more storage elements (for example, a capacitor).

Referring to FIG. 3, the pixel circuit SPC according to embodiments of the disclosure may include a first transistor TR1, a second transistor TR2, a third transistor TR3, and a storage capacitor Cst. However, embodiments of the disclosure are not limited thereto, and a configuration of the pixel circuit PXC may be freely implemented according to design of a person skilled in the art. Below, an embodiment in which the pixel circuit PXC includes the first to third transistors TR1 to TR3 and the storage capacitor Cst is described as an example.

The light emitting element LE may include a first electrode (one of an anode and a cathode, a second electrode (the other of the anode and the cathode), and a light emitting layer. For example, the light emitting layer may include an organic material and/or an inorganic material. For example, the light emitting element LE may be implemented as an organic light emitting diode having an organic light emitting layer. For example, the light emitting element LE may be implemented as an inorganic light emitting diode having an inorganic light emitting layer. For example, the light emitting layer of the light emitting element LE may include a nano rod.

Referring to FIG. 3, the first electrode (for example, the anode) of the light emitting element LE may be electrically connected to a second node N2. The second electrode (for example, the cathode) of the light emitting element LE may be electrically connected to a second power line PL2.

The second power voltage ELVSS is applied to the second power line PL2. For example, the second power voltage ELVSS may be a ground voltage or a low potential voltage of a level lower than the ground voltage.

The first transistor TR1 may be configured to switch an electrical connection between a first power line PL1 and the second node N2. The first transistor TR1 may include a gate electrode, a first electrode (one of a source electrode and a drain electrode), and a second electrode (the other of the source electrode and the drain electrode). The gate electrode of the first transistor TR1 may be electrically connected to a first node N1. The first electrode (for example, the drain electrode) of the first transistor TR1 may be electrically connected to the first power line PL1. The first power voltage ELVDD may be applied to the first power line PL1. For example, the first power voltage ELVDD may be a high potential voltage. The second electrode (for example, the source electrode) of the first transistor TR1 may be electrically connected to the second node N2. A data voltage Vdata or a voltage corresponding to the data voltage Vdata may be applied to the first node N1. A current corresponding to the voltage applied to the first node N1 may flow through the first transistor TR1.

The second transistor TR2 may be configured to switch an electrical connection between a data line DLj and the first node N1. An operation timing of the second transistor TR2 may be controlled by a first scan signal SCAN[i]. The first scan signal SCAN[i] may be applied to an i-th first scan line SCLi (hereinafter, abbreviated as a first scan line SCLi). The second transistor TR2 may be turned on in response to the first scan signal SCAN[i] of a turn-on level. When the second transistor TR2 is turned on, the data voltage Vdata may be applied to the first node N1.

The third transistor TR3 may be configured to switch an electrical connection between the second node N2 and the reference voltage line RVLk. An operation timing of the third transistor TR3 may be controlled by a second scan signal SENSE[i]. The second scan signal SENSE[i] may be applied to an i-th second scan line SNLi (hereinafter, abbreviated as a second scan line SNLi). The third transistor TR3 may be turned on in response to the second scan signal SENSE[i] of a turn-on level. When the third transistor TR3 is turned on, the second node N2 and the reference voltage line RVLk may be electrically connected. A voltage applied to the reference voltage line RVLk may be stored in a line capacitor Cline. The line capacitor Cline may be an intentionally and physically formed capacitor element rather than a parasitic capacitor. However, embodiments of the disclosure are not limited thereto.

Referring to FIG. 3, each of the first to third transistors TR1 to TR3 may be a transistor include an N-type semiconductor layer. In this case, a turn-on level voltage of the first to third transistors TR1 to TR3 may be a high level voltage (for example, a gate high voltage), and a turn-off level voltage may be a low level voltage (for example, a gate low voltage). According to an embodiment, at least one of the first to third transistors TR1 to TR3 may include a P-type semiconductor layer. In this case, a turn-on level voltage of the transistor including the P-type semiconductor layer may be a low level voltage (for example, a gate low voltage), and a turn-off level voltage may be a high level voltage (for example, a gate high voltage).

At least one of the first to third transistors TR1 to TR3 may include a semiconductor layer of amorphous silicon (“a-Si”). At least one of the first to third transistors TR1 to TR3 may include a semiconductor layer of polycrystalline silicon (“poly-Si”). At least one of the first to third transistors TR1 to TR3 may include an oxide semiconductor layer including metal oxide.

The storage capacitor Cst may be configured to maintain a voltage difference between the first node N1 and the second node N2. The storage capacitor Cst may include one side electrode electrically connected to the first node N1 and another side electrode electrically connected to the second node N2. The storage capacitor Cst may be an intentionally and physically formed capacitor element rather than a parasitic capacitor.

The output circuit 122 may output the data voltage Vdata to the data line DLj. An analog voltage Vsen applied to the reference voltage line RVLk may be input to the sensing circuit 124.

Figure 4:
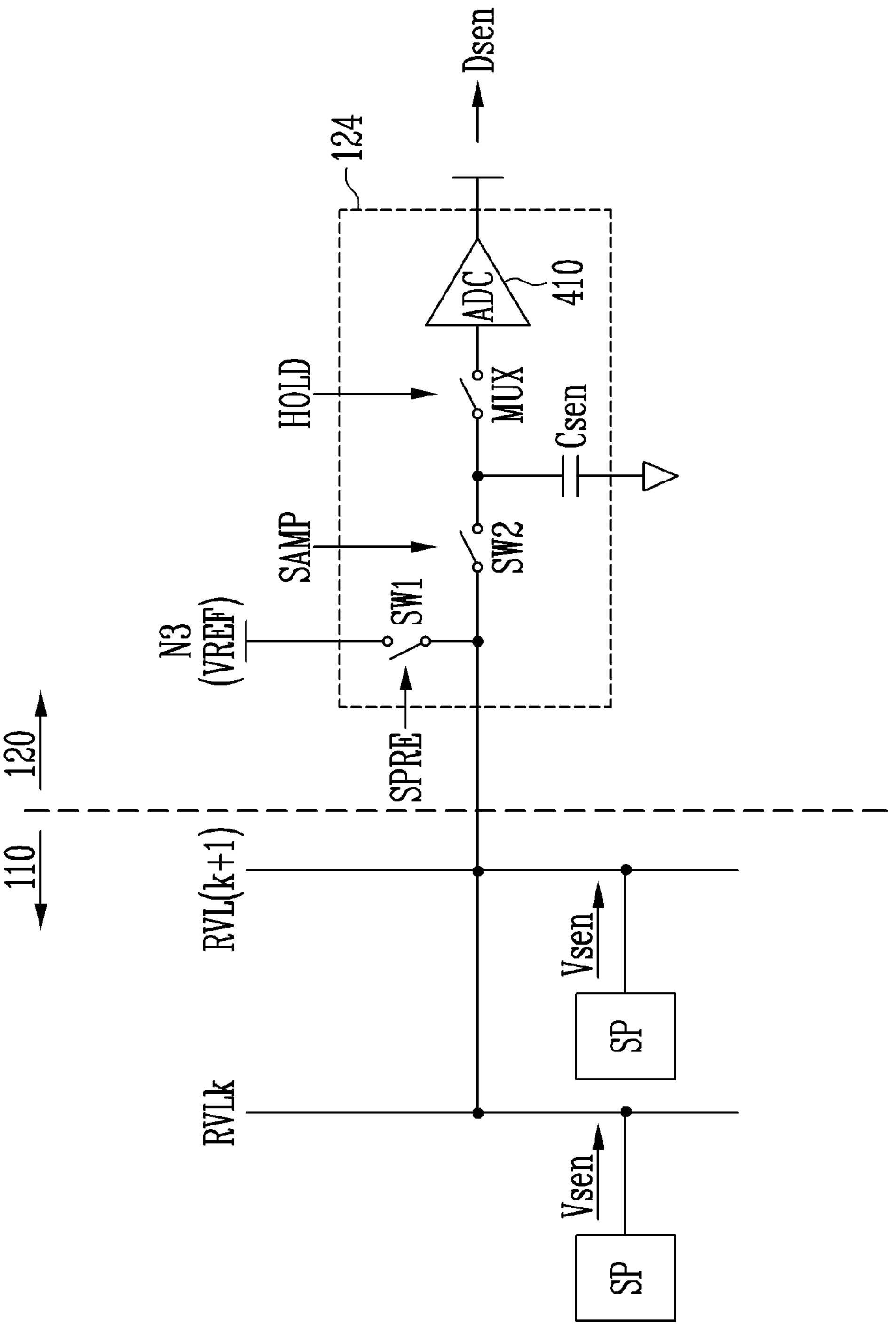
FIG. 4 is a diagram illustrating a sensing circuit in embodiments of the disclosure.

FIG. 4 is a diagram illustrating the sensing circuit 124 in embodiments of the disclosure.

The sensing circuit 124 may be included in the data driving circuit 120. The sensing circuit 124 may receive the analog voltage Vsen from a plurality of reference voltage lines. In an embodiment, the sensing circuit 124 may be connected to the k-th reference voltage line RVLk and the (k+1)-th reference voltage line RVL(k+1). The sensing circuit 124 may convert the input analog voltage Vsen into a sensing value Dsen corresponding thereto. The sensing circuit 124 may output the converted sensing value Dsen.

Referring to FIG. 4, the sensing circuit 124 may include a first switching element SW1, a second switching element SW2, a multiplexer MUX, a sensing capacitor Csen, an analog-to-digital converter 410, and the like.

The first switching element SW1 may be configured to switch an electrical connection between the third node N3 and the reference voltage lines RVLk and RVLk+1. An operation timing of the first switching element SW1 may be controlled by a reference voltage switching signal SPRE. When the first switching element SW1 is turned on in response to the reference voltage switching signal SPRE (for example, the reference voltage switching signal SPRE of a turn-on level), a reference voltage VREF may be applied to the reference voltage lines RVLk and RVLk+1. The first switching element SW1 may be implemented as a transistor.

The second switching element SW2 may be configured to switch an electrical connection between the reference voltage lines RVLk and RVLk+1 and the sensing capacitor Csen. An operation timing of the second switching element SW2 may be controlled by a sampling control signal SAMP. When the second switching element SW2 is turned on by the sampling control signal SAMP (for example, the sampling control signal SAMP of a turn-on level), the analog sensing voltage Vsen or a voltage corresponding thereto may be stored in the sensing capacitor Csen.

The sensing capacitor Csen may include one side electrode electrically connected to the second switching element SW2 and another side electrode to which a constant voltage is applied (or grounded). A voltage corresponding to the analog voltage Vsen may be applied to the one side electrode of the sensing capacitor Csen. The analog voltage Vsen or the voltage corresponding thereto may be stored in the sensing capacitor Csen.

The multiplexer MUX may be configured to switch an electrical connection between the sensing capacitor Csen and the analog-to-digital converter 410. For example, the multiplexer MUX may be implemented as an N:1 multiplexer including two or more input terminals (for example, N (N is an integer 2 or more) input terminals) and one output terminal. An operation timing of the multiplexer MUX may be controlled by a hold control signal HOLD. When the multiplexer MUX is turned on by the hold control signal HOLD (for example, the hold control signal HOLD of a turn-on level), a voltage may be applied from the sensing capacitor Csen connected to a corresponding input terminal. A voltage output from the multiplexer MUX may be input to the analog-to-digital converter 410.

The analog-to-digital converter 410 may be configured to convert an analog voltage into a digital value corresponding thereto. For example, referring to FIG. 4, the analog-to-digital converter 410 may receive an analog voltage output from the multiplexer MUX and convert the input analog voltage into a digital value corresponding thereto. The analog-to-digital converter 410 may output the converted digital value. The output digital value may correspond to the sensing value Dsen. The output sensing value Dsen may be input to the timing controller 140 (refer to FIG. 1) described above.

Figure 5:
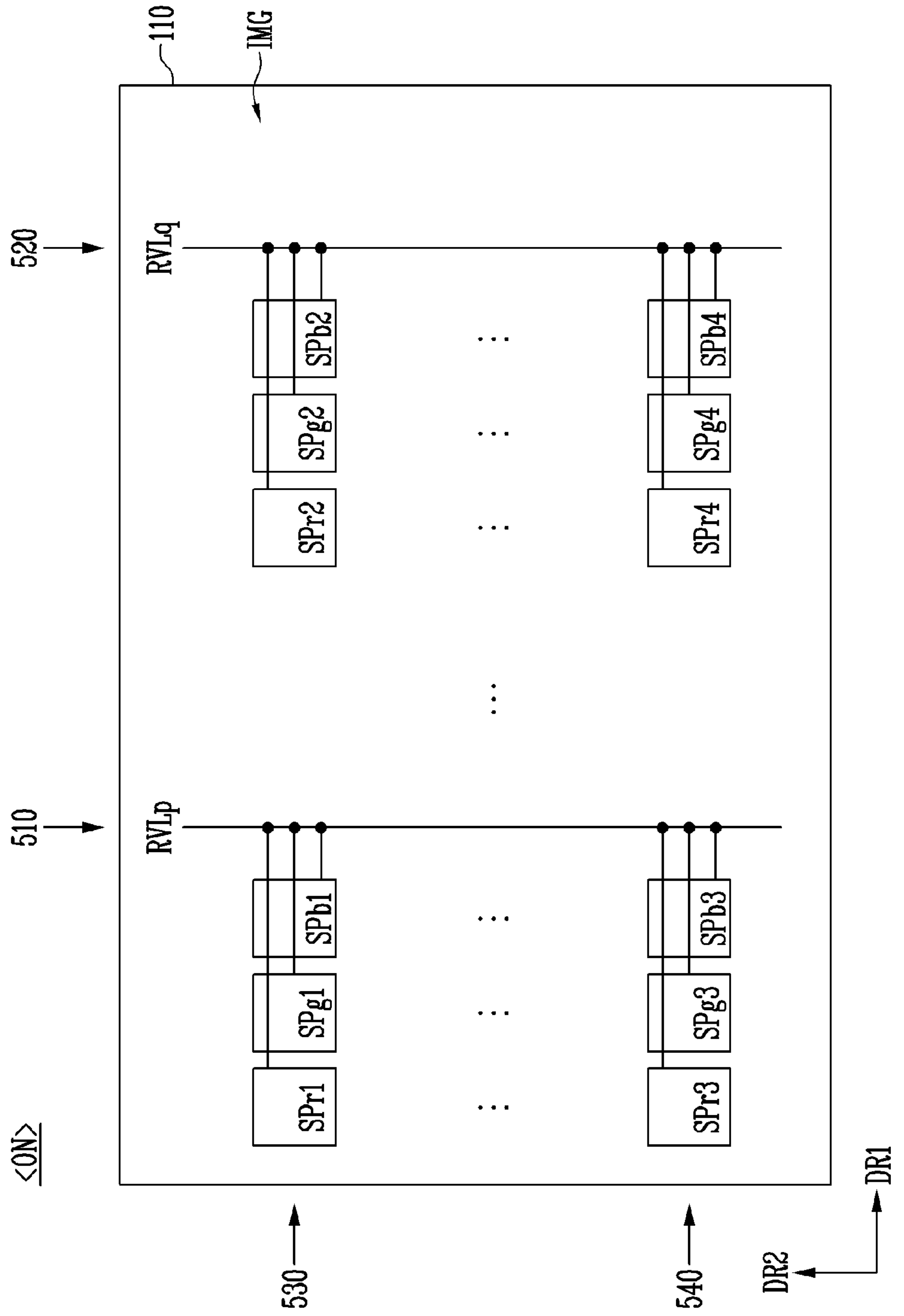
FIG. 5 is a diagram illustrating an image displayed on a display panel in an on state.

FIG. 5 is a diagram illustrating that an image IMG is displayed on the display panel 110 in an on state ON.

When the display device 100 (refer to FIG. 1) is in the on state ON, the image IMG may be displayed on the display panel 110.

Referring to FIG. 5, a p-th reference voltage line RVLp and a q-th reference voltage line RVLq may be disposed in the display panel 110. Here, the p-th reference voltage line RVLp may indicate an odd column 510. The q-th reference voltage line RVLq may indicate an even column 520.

The p-th reference voltage line RVLp may be connected to a first red sub-pixel SPr1, a first green sub-pixel SPg1, and a first blue sub-pixel SPb1. The q-th reference voltage line RVLq may be connected to a second red sub-pixel SPr2, a second green sub-pixel SPg2, and a second blue sub-pixel SPb2. The first red sub-pixel SPr1, the first green sub-pixel SPg1, the first blue sub-pixel SPb1, the second red sub-pixel SPr2, the second green sub-pixel SPg2, and the second blue sub-pixel SPb2 may be positioned in an odd row 530.

The p-th reference voltage line RVLp may be connected to a third red sub-pixel SPr3, a third green sub-pixel SPg3, and a third blue sub-pixel SPb3. The q-th reference voltage line RVLq may be connected to a fourth red sub-pixel SPr4, a fourth green sub-pixel SPg4, and a fourth blue sub-pixel SPb4. The third red sub-pixel SPr3, the third green sub-pixel SPg3, the third blue sub-pixel SPb3, the fourth red sub-pixel SPr4, the fourth green sub-pixel SPg4, and the fourth blue sub-pixel SPb4 may be positioned in an even row 540.

The odd column 510 and the even column 520 may overall extend in the second direction DR2. The odd row 530 and the even row 540 may overall extend in the first direction DR1.

When the display device 100 (refer to FIG. 1) is in the on state ON, the sub-pixels disposed in the display panel 110 may display the image IMG. While the display panel 110 displays the image IMG, a temperature of the display panel 110 may increase.

Figure 6:
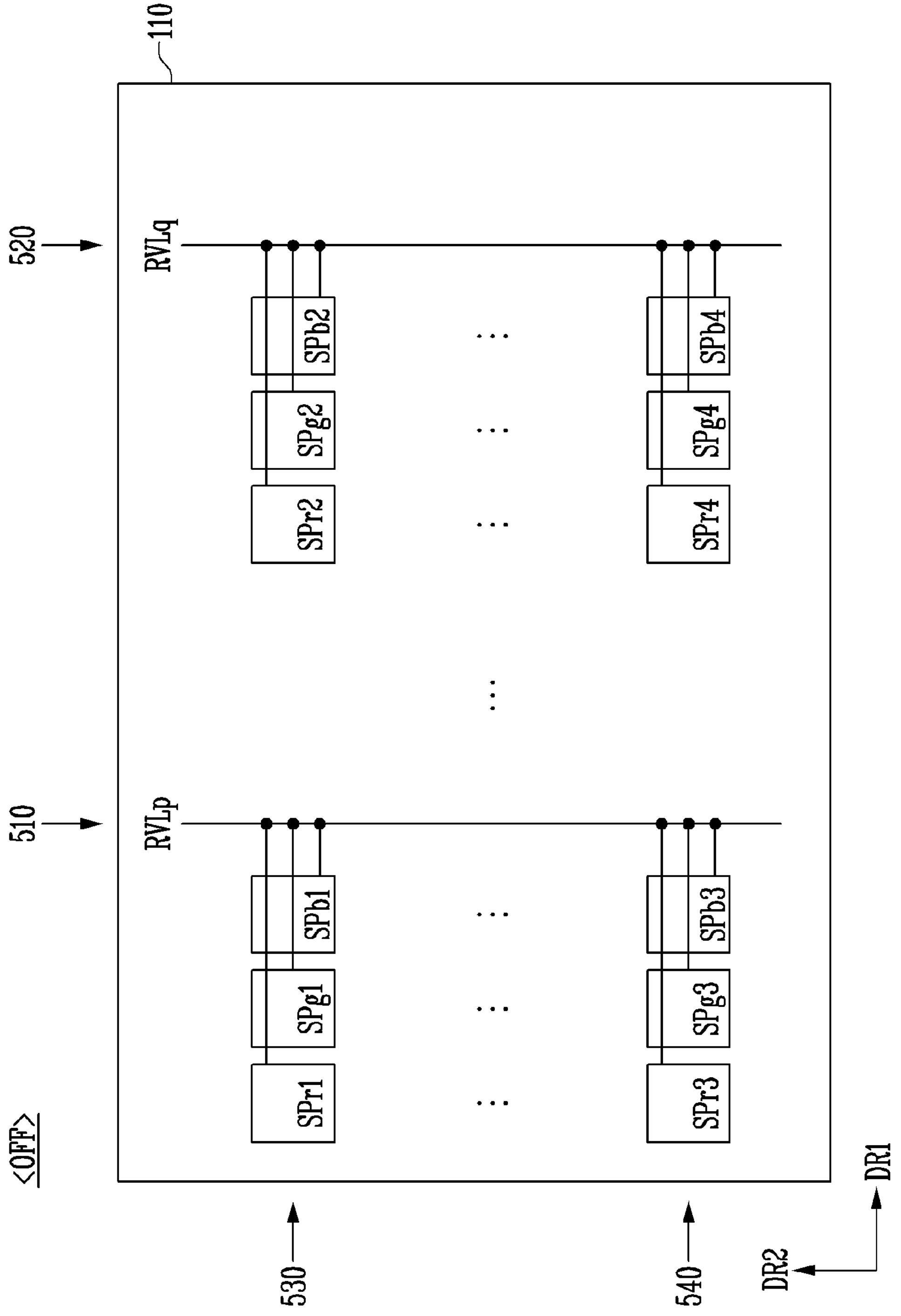
FIG. 6 is a diagram illustrating that an image is not displayed on the display panel in an off state.

FIG. 6 is a diagram illustrating that an image is not displayed on the display panel 110 in an off state OFF.

When the display device 100 (refer to FIG. 1) is in the off state OFF, the sub-pixels disposed in the display panel 110 may not display an image. While an image is not displayed on the display panel 110, the temperature of the display panel 110 may gradually decrease.

In the off state OFF, the sub-pixels may be sensed. According to a result of sensing the sub-pixels, a characteristic value change of circuit elements included in the sub-pixels may be compensated. For example, referring to FIG. 3, a change in a characteristic value (for example, a threshold voltage) of the first transistor TR1 of the sub-pixel SP may be compensated.

Meanwhile, when the display device 100 (refer to FIG. 1) is switched from the on state ON (refer to FIG. 5) to the off state OFF, the temperature of the display panel 110 may gradually decrease. In the above case, a partial sub-pixel may be sensed when the temperature is high, and a partial sub-pixel may be sensed when the temperature is low. According to this, reliability of sensing may be reduced. Therefore, a method that may increase reliability of sensing even though the sub-pixel is sensed under a condition where the temperature of the display panel 110 gradually decreases is required.

Figure 7A:
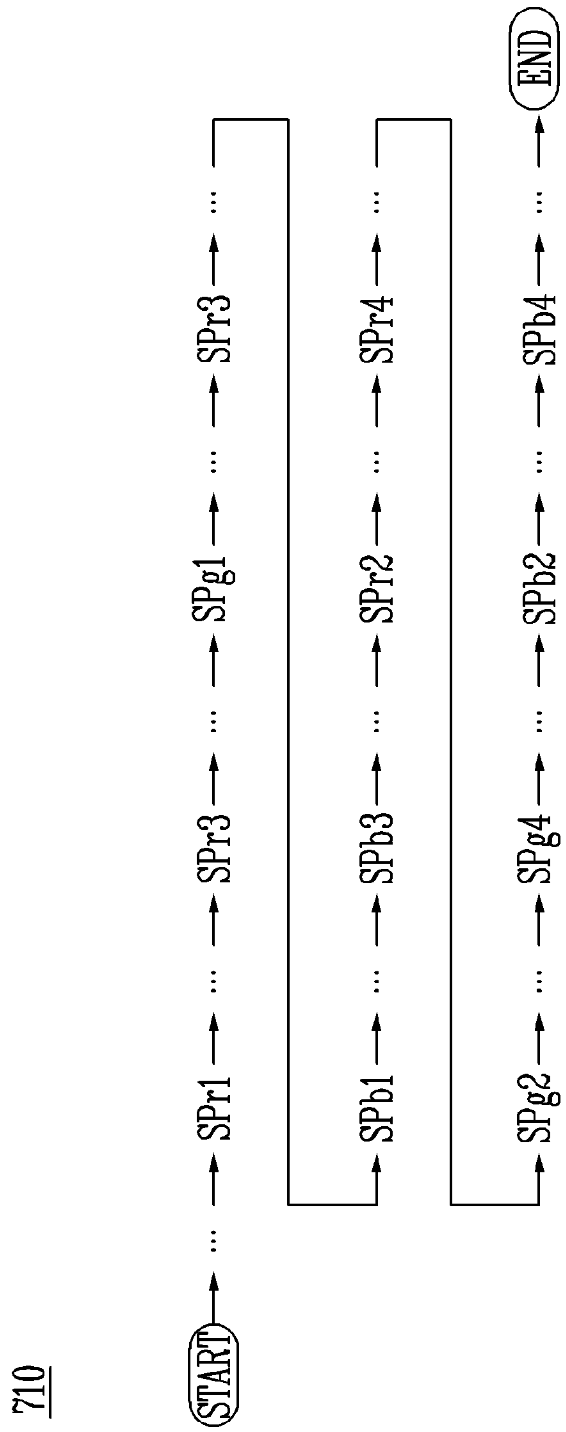
FIG. 7A is a diagram illustrating a method of sensing a sub-pixel according to an embodiment.
Figure 7B:
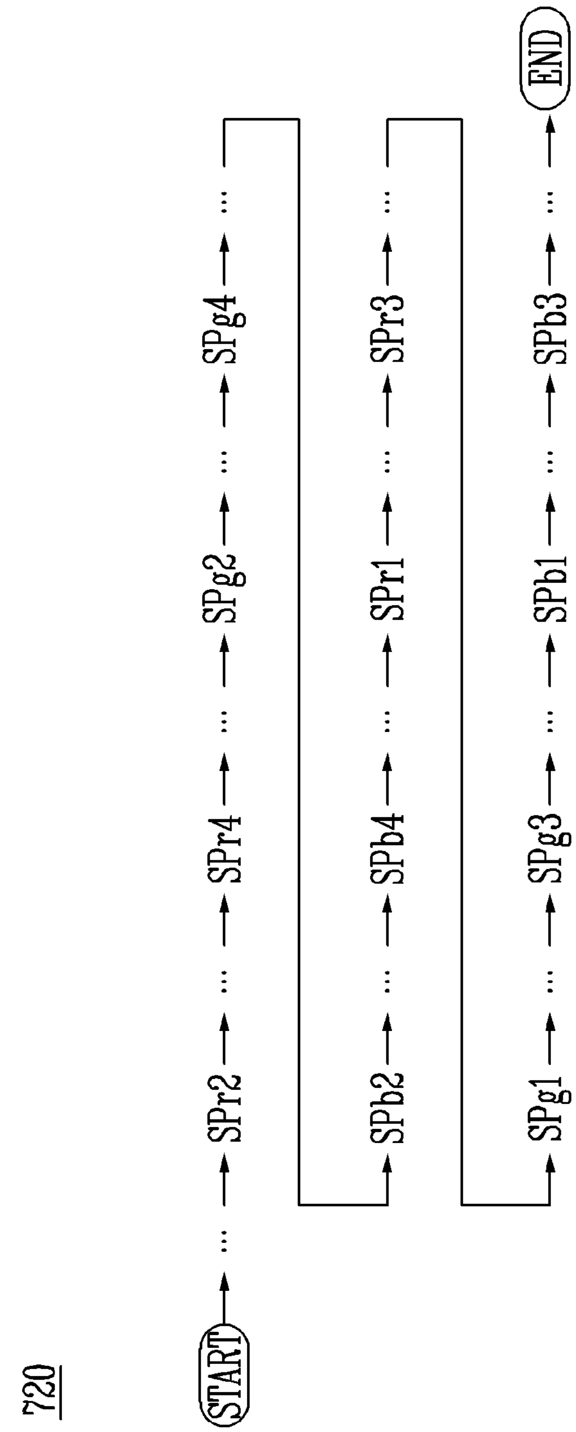
FIG. 7B is a diagram illustrating a method of sensing a sub-pixel according to another embodiment.

FIG. 7A is a diagram illustrating a method 710 of sensing a sub-pixel according to an embodiment. FIG. 7B is a diagram illustrating a method 720 of sensing a sub-pixel according to another embodiment.

Referring to FIGS. 6 and 7A, the method 710 of sensing the sub-pixel according to an embodiment may sense (for example, sequentially sense) the first color sub-pixels positioned in the odd columns 510, sense the second color sub-pixels positioned in the odd columns 510, sense third color sub-pixels positioned in the odd columns 510, sense the first color sub-pixels positioned in the even columns 520, sense the second sub-pixels positioned in the even columns 520, and sense the third color sub-pixels positioned in the even columns 520.

In the above embodiment, the first red sub-pixel SPr1, the third red sub-pixel SPr3, the first green sub-pixel SPg1, the third green sub-pixel SPg3, the first blue sub-pixel SPb1, the third blue sub-pixel SPb3, the second red sub-pixel SPr2, the fourth red sub-pixel SPr4, the second green sub-pixel SPg2, the fourth green sub-pixel SPg4, the second blue sub-pixel SPb2, and the fourth blue sub-pixel SPb4 may be sequentially sensed.

Referring to FIGS. 6 and 7B, the method 720 of sensing the sub-pixel according to another embodiment may sense (for example, sequentially sense) the first color sub-pixels positioned in the even columns 520, sense the second color sub-pixels positioned in the even columns 520, sense the third color sub-pixels positioned in the even columns 520, sense the first color sub-pixels positioned in the odd columns 510, sense the second color sub-pixels positioned in the odd columns 510, and sense the third color sub-pixels positioned in the odd columns 510.

However, each of the methods 710 and 720 of sensing the sub-pixel shown in FIGS. 7A and 7B is merely an example, and embodiments of the disclosure are not limited thereto.

Figure 8:
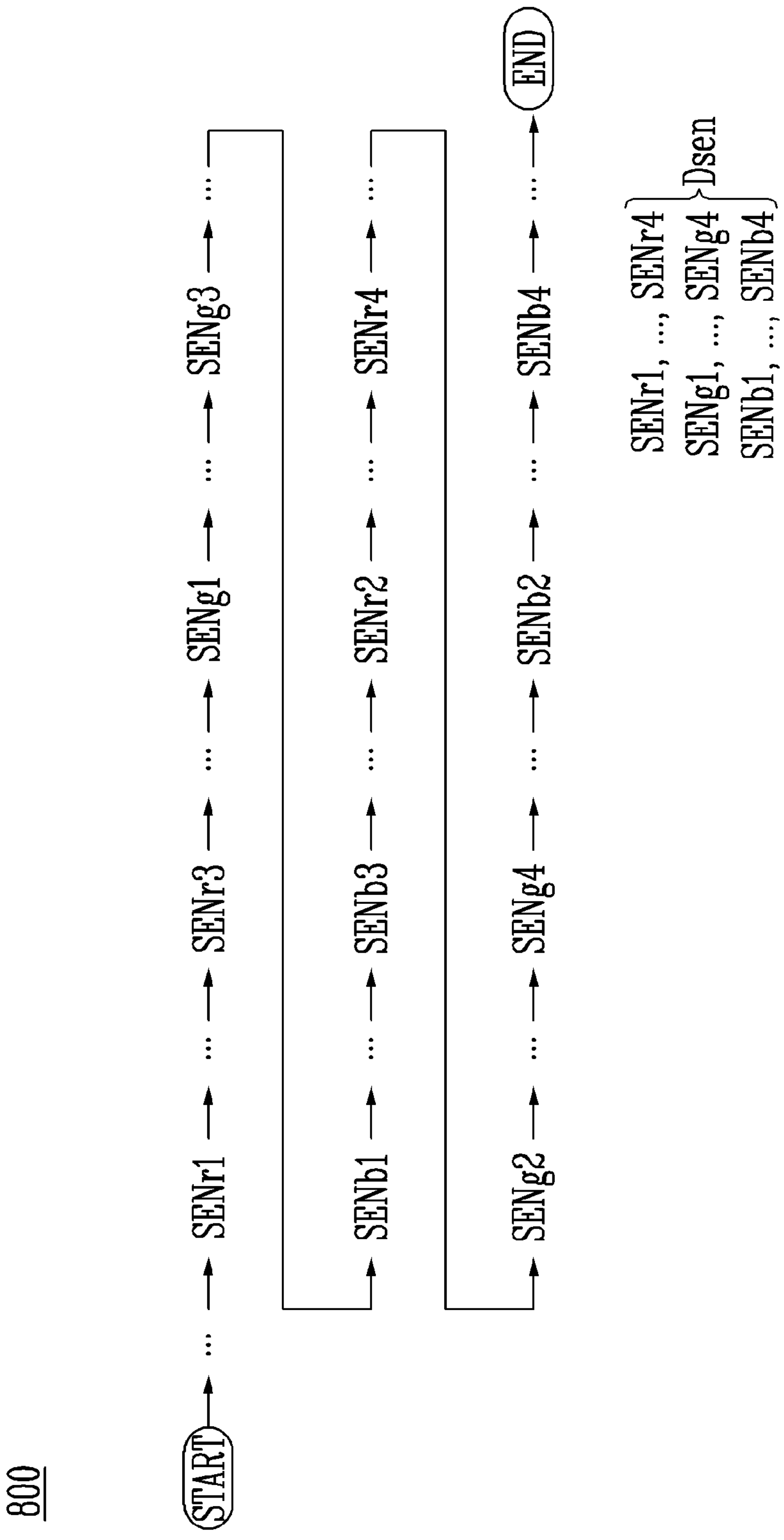
FIG. 8 is a diagram illustrating a method of detecting sensing values in the embodiment of FIG. 7A.

FIG. 8 is a diagram illustrating a method 800 of detecting the sensing values in the embodiment of FIG. 7A.

Referring to FIG. 8, FIG. 8 illustrates that sensing values Dsen are detected in the embodiment of FIG. 7A. According to the method 800 of detecting the sensing values, a sensing value SENr1 of the first red sub-pixel, a sensing value SENr3 of the third red sub-pixel, a sensing value SENg1 of the first green sub-pixel, a sensing value SENg3 of the third green sub-pixel, a sensing value SENb1 of the first blue sub-pixel, a sensing value SENb3 of the third blue sub-pixel, a sensing value SENr2 of the second red sub-pixel, a sensing value SENr4 of the fourth red sub-pixel, a sensing value SENg2 of the second green sub-pixel, a sensing value SENg4 of the fourth green sub-pixel, a sensing value SENb2 of the second blue sub-pixel, and a sensing value SENb4 of the fourth blue sub-pixel may be sequentially detected.

Figure 9:
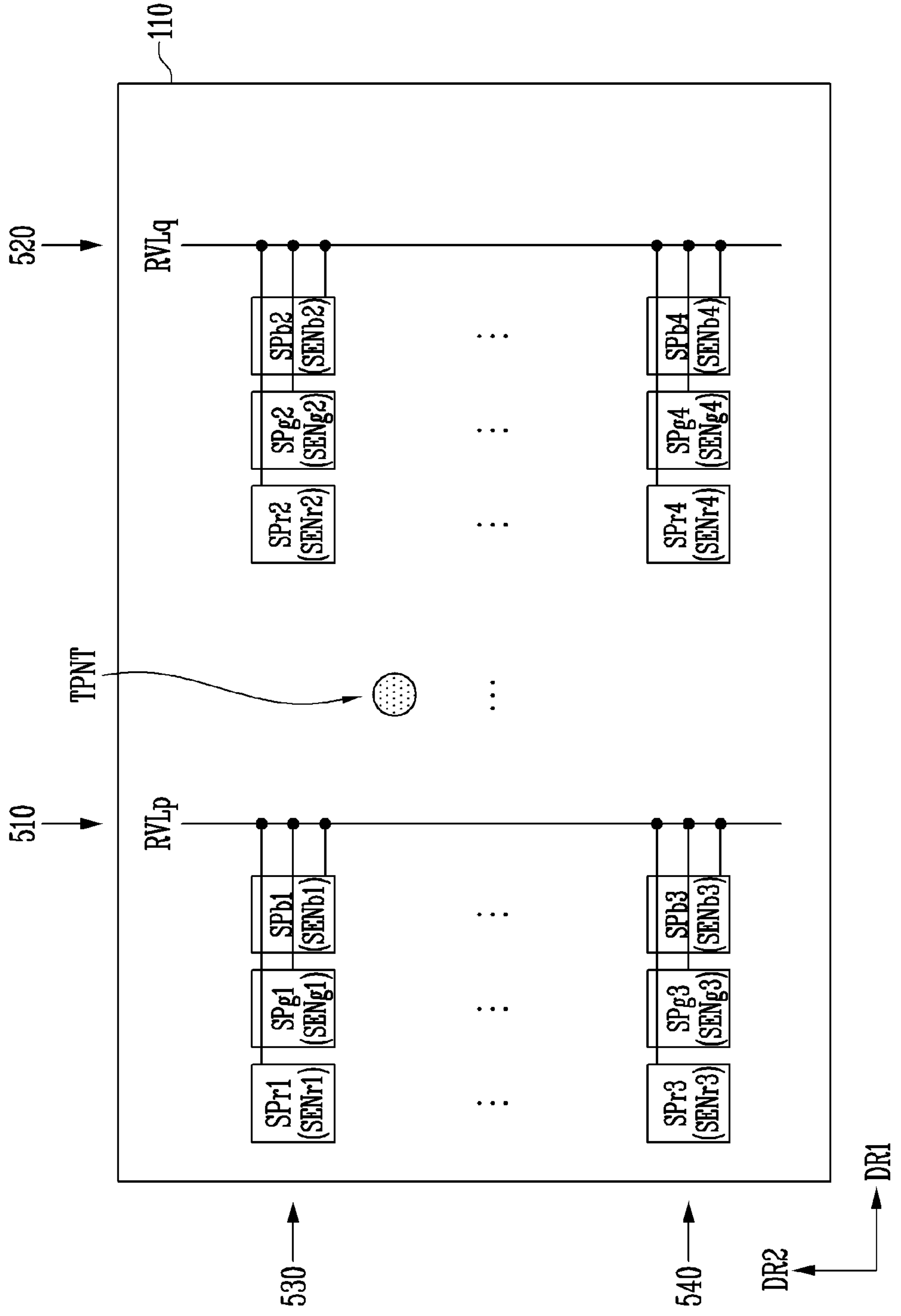
FIG. 9 is a diagram illustrating a temperature measurement point and sensing values of the display panel.

FIG. 9 is a diagram illustrating a temperature measurement point TPNT of the display panel 110 and the sensing values.

Referring to FIG. 9, the temperature may be measured at a predetermined point of the display panel 110. The predetermined point where the temperature is measured in the display panel 110 may be the temperature measurement point TPNT.

A position of the temperature measuring point TPNT may be freely determined according to design of a person skilled in the art.

Meanwhile, when the display panel 110 does not display an image, the temperature of the display panel 110 may gradually decrease. In this case, characteristics of the sensing value detected in a state in which the temperature is high and the sensing value detected in a state in which the temperature is low may be different from each other. In this case, reliability of sensing and compensation may be reduced.

For example, in an embodiment in which the first red sub-pixel SPr1 is sensed first and the second red sub-pixel SPr2 is sensed later (for example, refer to the method 710 of sensing the sub-pixel of FIG. 7A), the first red sub-pixel SPr1 may be sensed in the state in which the temperature is high, and the second red sub-pixel SPr2 may be sensed in the state in which the temperature is low. In this case, even though the first red sub-pixel SPr1 and the second red sub-pixel SPr2 are adjacent to each other, a relatively large difference may exist between the sensing value SENr1 of the first red sub-pixel SPr1 and the sensing value SENr2 of the second red sub-pixel SPr2.

As a method for solving this, a method of sensing the sub-pixels in a state in which the temperature of the display panel 110 becomes sufficiently low entirely may be considered. However, according to this method, a problem that a relatively long time is required for the temperature of the display panel 110 to become sufficiently low exists. In addition, since a possibility that the display panel 110 displays an image again before sensing and compensation of the sub-pixels are completed is increased, a problem that display quality of the display panel 110 is reduced may occur.

Therefore, a method of correcting the sensing values detected in the state in which the temperature of the display panel 110 is high using the sensing values detected in the state in which the temperature of the display panel 110 is low, and compensating for the sub-pixels based on the corrected sensing values, to improve reliability of compensation is desirable.

Figure 10:
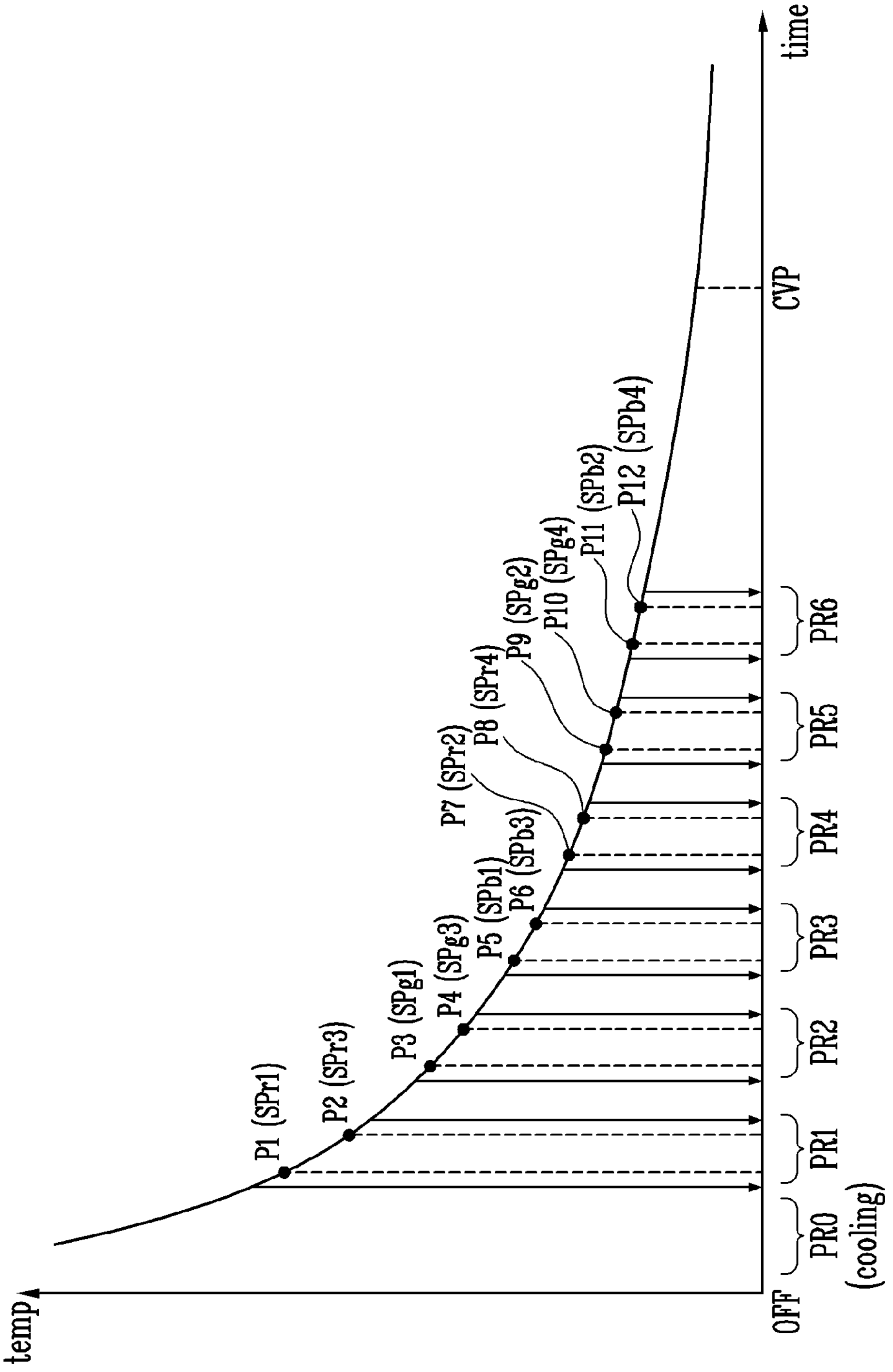
FIG. 10 is a graph illustrating a change in a temperature over time at the temperature measurement point of FIG. 9.

FIG. 10 is a graph illustrating a change in the temperature over time at the temperature measurement point TPNT of FIG. 9.

Referring to FIG. 10, the temperature of the temperature measurement point TPNT of FIG. 9 may gradually decrease after the off state OFF.

The temperature of the display panel may rapidly change in a 0-th period PR0 after the off state OFF. The 0-th period PR0 may be a period in which the temperature of the display panel rapidly decreases, and the sub-pixels may not be sensed during this period. The 0-th period PR0 may be a cooling period. In an embodiment, the 0-th period PR0 may be omitted. In an embodiment, a length of the 0-th period PR0 may be about 1 minute. However, embodiments of the disclosure are not limited thereto. The length of the 0-th period PR0 may be freely set by a person skilled in the art in consideration of heat dissipation performance or the like of the display panel.

After the off state OFF, first to sixth periods PR1 to PR6 may be provided. The first to sixth periods PR1 to PR6 may be periods for sensing sub-pixels of the same color positioned in the odd column or the even column, respectively. Below, the disclosure is described with reference to FIGS. 7A, 9, and 10.

In the first period PR1, the first color sub-pixels positioned in the odd column 510 may be sensed. For example, in the first period PR1, the first red sub-pixel SPr1 and the third red sub-pixel SPr3 may be sequentially sensed.

In the second period PR2, the second color sub-pixels positioned in the odd column 510 may be sensed. For example, in the second period PR2, the first green sub-pixel SPg1 and the third green sub-pixel SPg3 may be sequentially sensed.

In the third period PR3, the blue sub-pixels positioned in the odd column 510 may be sensed. For example, in the third period PR3, the first blue sub-pixel SPb1 and the third blue sub-pixel SPb3 may be sequentially sensed.

In the fourth period PR4, the red sub-pixels positioned in the even column 520 may be sensed. For example, in the fourth period PR4, the second red sub-pixel SPr2 and the fourth red sub-pixel SPr4 may be sequentially sensed.

In the fifth period PR5, the green sub-pixels positioned in the even column 520 may be sensed. For example, in the fifth period PR5, the second green sub-pixel SPg2 and the fourth green sub-pixel SPg4 may be sequentially sensed.

In the sixth period PR6, the blue sub-pixels positioned in the even column 520 may be sensed. For example, in the sixth period PR6, the second blue sub-pixel SPb2 and the fourth blue sub-pixel SPb4 may be sequentially sensed.

The temperature of a time point when the sub-pixel is sensed in each of the first to sixth periods PR1 to PR6 may gradually decrease. For example, the temperature at a time point when the first red sub-pixel SPr1 is sensed may be a first temperature P1, and the temperature at a time point when the third red sub-pixel SPr3 is sensed may be a second temperature P2. The second temperature P2 may be lower than the first temperature P1.

As the first to sixth periods PR1 to PR6 are progressed, the temperature of the time point when the sub-pixel is sensed may gradually decrease. For example, the temperature of the time point when the third red sub-pixel SPr3 is sensed in the first period PR1 may be the second temperature P2, and the temperature of the time point when the first green sub-pixel SPg1 is sensed in the second period PR2 may be the third temperature P3. The third temperature P3 may be lower than the second temperature P2.

After a predetermined time has elapsed, the temperature of the temperature measurement point TPNT (refer to FIG. 9) may converge (for example, substantially converge). Referring to FIG. 10, a change in the temperature measured at the temperature measurement point CPNT may be small after a time corresponding to a convergence point CVP has elapsed.

FIG. 11 is a table 1100 illustrating an average sensing value 1160 for each row calculated in the first period PR1.

Referring to the table 1100, items of a sensing period 1110, a sensing object 1120, a row 1130, a column 1140, a sensing value 1150, an average sensing value for each row 1160, and values thereof may be included.

The table 1100 of FIG. 11 specifically illustrates a case where the sensing period 1110 is the first period PR1.

The sensing object 1120 indicates a sub-pixel sensed in the sensing period 1110. In the first period PR1, the red sub-pixels positioned in the odd column may be sensed.

The row 1130 indicates a row where the sensing sub-pixels are positioned. Referring to FIG. 1, sensing may be performed on m rows.

The column 1140 indicates a column where the sensing sub-pixels are positioned. Referring to the sensing object 1120, sensing may be performed on the odd row. For example, when n is an even number, sensing may be performed on a first column, a third column, an (n−1)-th column, and the like.

The sensing value 1150 indicates individual sensing values Dsen obtained by sensing the sub-pixel positioned in a corresponding area. For example, a sensing value obtained by sensing a red sub-pixel positioned in a first row and a first column may be referred to as "Dsen_r_1_1". A sensing value obtained by sensing a red sub-pixel positioned in a first row and a third column may be referred to as "Dsen_r_1_3". A sensing value obtained by sensing a red sub-pixel positioned in a first row and an (n−1)-th column may be referred to as "Dsen_r_1_n−1".

The average sensing value for each row 1160 may be a value calculated for each row, and may indicate a representative value (for example, an average sensing value) of the sensing values obtained by sensing the sub-pixels positioned in a corresponding row. For example, the average sensing value for each row 1160 of the red sub-pixels positioned in the first row may be calculated by adding all of "Dsen_r_1_1", "Dsen_r_1_3", "Dsen_r_1_n−1", and the like which are the sensing values, and dividing a value obtained by the addition by n/2 which is the number of odd columns. For example, an average sensing value for each row of the red sub-pixels positioned in first row odd columns may be referred to as "AVGr_odd_1". An average sensing value for each row of red sub-pixels positioned in second row odd columns may be referred to as "AVGr_odd_2".

FIG. 12 is a table 1200 illustrating an average sensing value for each row calculated in the first to sixth periods PR1 to PR6.

Referring to FIG. 12, in the table 1200, a sensing period 1210, a sensing object 1220, an average sensing value for each row 1230, and an average sensing value for each period 1240 may be included.

The sensing period 1210 may include the first to sixth periods PR1 to PR6.

In the sensing object 1220, the sub-pixels sensed in each of the first to sixth periods PR1 to PR6 may be included. For example, the sensing object of the first period PR1 may be the red sub-pixels positioned in the odd column. The sensing object of the second period PR2 may be the green sub-pixels positioned in the odd column.

The average sensing value for each row 1230 may indicate an average sensing value for each row of the sensing values calculated by sensing the sub-pixels that are sensing objects during each period. The average sensing value for each row 1230 corresponds to the average sensing value for each row 1160 of FIG. 11 described above.

The average sensing value for each period 1240 corresponds to the average sensing value of the average sensing values for each row calculated in a corresponding sensing period. For example, an average sensing value for each period of the first period PR1 may be calculated by adding all of "AVGr_odd_1", "AVGr_odd_2", and "AVGr_odd_m" and dividing a value obtained by the addition by m which is the number of rows. The average sensing value for each period of the first period PR1 may be referred to as "AVGr_odd". Similarly, an average sensing value for each period of the second period PR2 may be referred to as "AVGg_odd".

Referring to this, the average sensing value for each period calculated in the first period PR1 is "AVGr_odd", and an average sensing value for each period calculated in the fourth period PR4 is "AVGr_even". A difference between "AVGr_odd" and "AVGr_even" may be caused by a gradual decrease in the temperature of the display panel.

FIG. 13 is a table 1300 illustrating a normalization constant 1370 for each row, a correction sensing value 1380, a correction average sensing value 1390 for each row, and the like calculated in the first period PR1 in an embodiment.

In the table 1300, a sensing period 1310, a sensing object 1320, a row 1330, a column 1340, a sensing value 1350, an average sensing value for each row 1360, a normalization constant for each row 1370, a correction sensing value 1380, a correction average sensing value for each row 1390, a correction average sensing value for each period 1395, and the like may be included.

The sensing period 1310, the sensing object 1320, the row 1330, the column 1340, the sensing value 1350, and the average sensing value for each row 1360 are the same as the sensing period 1110, the sensing object 1120, the row 1330, the column 1340, the sensing value 1150, and the average sensing value for each row 1160, respectively, described above in FIG. 11. A description of these is omitted.

The normalization constant 1370 for each row may be a value calculated from the average sensing values 1360 for each row. For example, the normalization constant 1370 for each row may be calculated by subtracting the average sensing value for each row of the red sub-pixels positioned in the even column of the first row from the average sensing value for each row of the red sub-pixels positioned in the odd column of the first row. In the above case, the normalization constant for each row for the first row of the red sub-pixels positioned in the odd column may be calculated as "AVGr_odd_1−AVGr_even_1". Similarly, the normalization constant for each row for the second row may be calculated as "AVGr_odd_2−AVGr_even_2". Accordingly, the normalization constant for each row may be calculated for each row.

The correction sensing value 1380 may indicate individual correction sensing values Dsen_revised of sub-pixels positioned in a corresponding area. The correction sensing value Dsen_revised may be calculated by subtracting the normalization constant for each row of the corresponding row from the sensing value Dsen. For example, the correction sensing value of the red sub-pixel positioned in the first row and the first column may be calculated as "Dsen_r_1_1−(AVGr_odd_1−AVGr_even_1)". The correction sensing value of the red sub-pixel positioned in the first row and the third column may be calculated as "Dsen_r_1_3−(AVGr_odd_1−AVGr_even_1)". The correction sensing value of the red sub-pixel positioned in the first row and the (n−1)-th column may be calculated as "Dsen_r_1_n−1−(AVGr_odd_1−AVGr_even_1)".

The correction average sensing value for each row 1390 may indicate a value obtained by calculating an average of the correction sensing value 1380 in a row unit. According to this, the correction average sensing value for each row of the sub-pixels positioned in the first row among the red sub-pixels positioned in the odd column may be "AVGr_even_1". This is the same as the average sensing value for each row of the sub-pixels positioned in the first row among the red sub-pixels positioned in the even column. According to this, a difference in a sensing value due to the temperature may be substantially eliminated with respect to the red sub-pixels positioned in the odd column and the red sub-pixels positioned in the even column.

The correction average sensing value 1395 for each period may indicate an average sensing value of the correction average sensing value 1390 for each row during a corresponding period. Referring to FIG. 13, the correction average sensing value for each period of the first period PR1 may be calculated by adding all of "AVGr_even_1", "AVGr_even_2", and the like, and dividing a value obtained by the addition by m which is the number of rows. According to this, the correction average sensing value for each period of the first period PR1 may be "AVGr_even". This is the same as "AVGr_even", which is the average sensing value for each period of the fourth period PR4 of FIG. 12 described above. According to this, a difference in the sensing value due to the temperature may be substantially eliminated with respect to the red sub-pixels positioned in the odd column and the red sub-pixels positioned in the even column.

Figure 14:
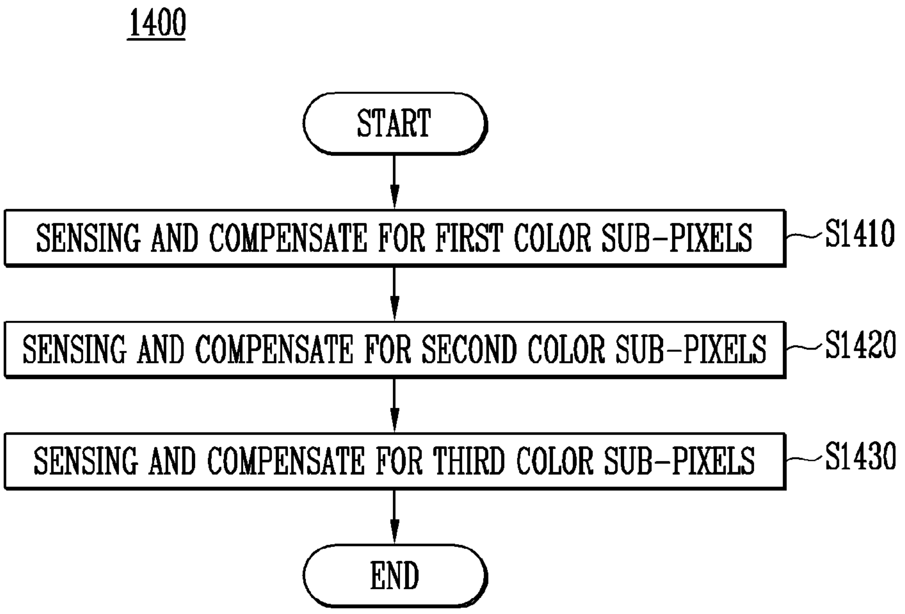
FIG. 14 is a flowchart of a method of driving a display device according to an embodiment.

FIG. 14 is a flowchart of a method 1400 of driving a display device according to an embodiment.

Referring to FIG. 14, the method 1400 of driving the display device according to embodiments of the disclosure may include sensing and compensating for the first color sub-pixels (S1410), sensing and compensating for the second color sub-pixels (S1420), and sensing and compensating for the third color sub-pixels (S1430).

In an embodiment, while sensing and compensating for the first color sub-pixels (S1410), sensing and compensating for the second color sub-pixels (S1420), and sensing and compensating for the third color sub-pixels (S1430) are performed, the temperature of the display device 100 (refer to FIG. 1) or the display panel 110 (refer to FIG. 1) included therein may gradually decrease.

Each step may be performed substantially identically or similarly. Below, the disclosure is described based on a method of sensing and compensating for the first color sub-pixels.

Figure 15:
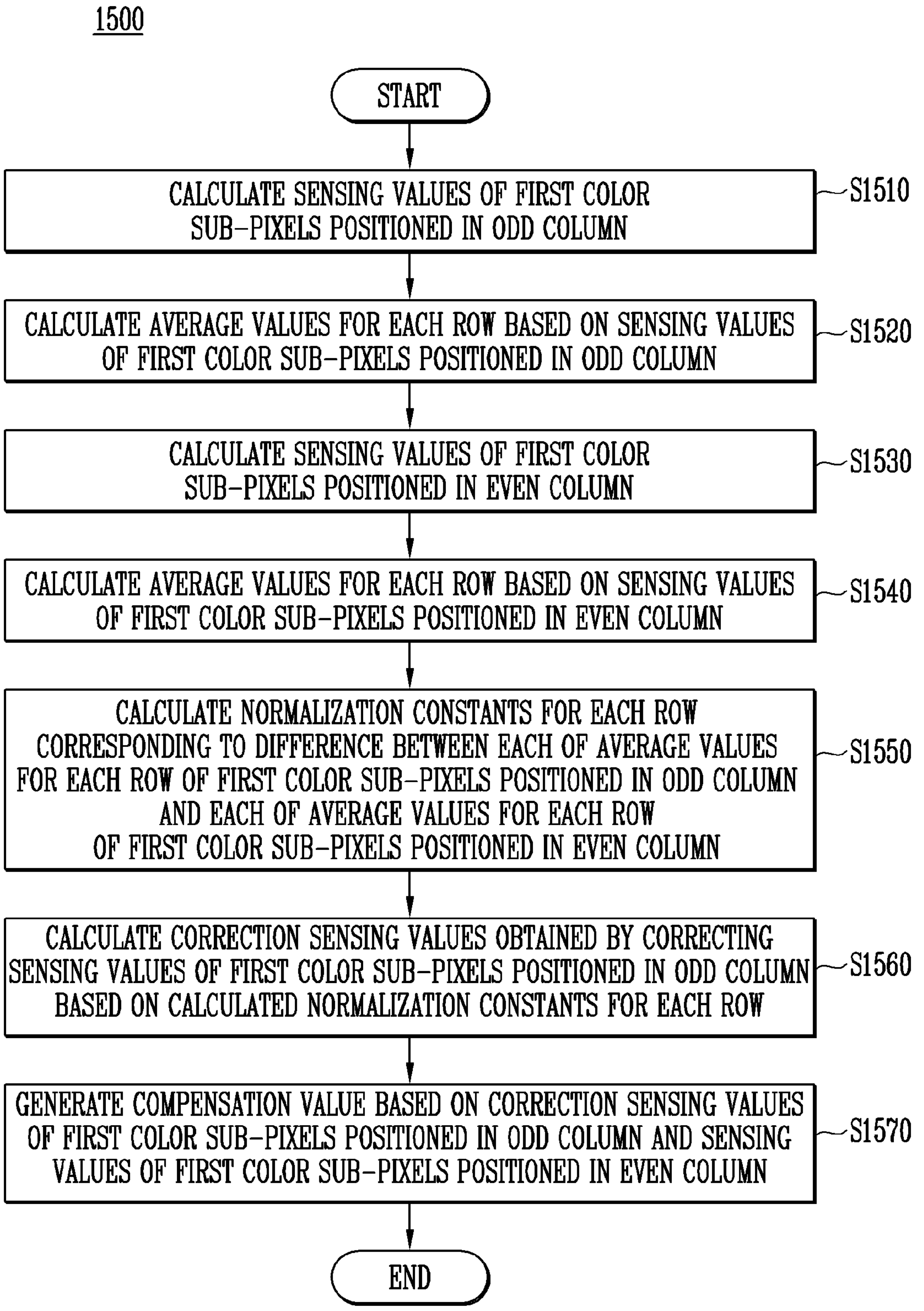
FIG. 15 is a flowchart illustrating a method of sensing and compensating for first color sub-pixels in an embodiment.

FIG. 15 is a flowchart illustrating a method 1500 of sensing and compensating for first color sub-pixels in an embodiment.

Referring to FIG. 15, the method 1500 of sensing and compensating for the first color sub-pixels according to embodiments of the disclosure may include calculating the sensing values of the first color sub-pixels positioned in the odd column (S1510), calculating the average sensing values for each row based on the sensing values of the first color sub-pixels positioned in the odd column (S1520), calculating the sensing values of the first color sub-pixels positioned in the even column (S1530), calculating the average sensing values for each row based on the sensing values of the first color sub-pixels positioned in the even column (S1540), calculating the normalization constants for each row corresponding to a difference between each of the average sensing values for each row of the first color sub-pixels positioned in the odd column and each of the average sensing values for each row of the first color sub-pixels positioned in the even column (S1550), calculating the correction sensing values obtained by correcting the sensing values of the first color sub-pixels positioned in the odd column based on the calculated normalization constants for each row (S1560), calculating the compensation value based on the correction sensing values of the first color sub-pixels positioned in the odd column and the sensing values of the first color sub-pixels positioned in the even column (S1570), and the like.

Figure 16:
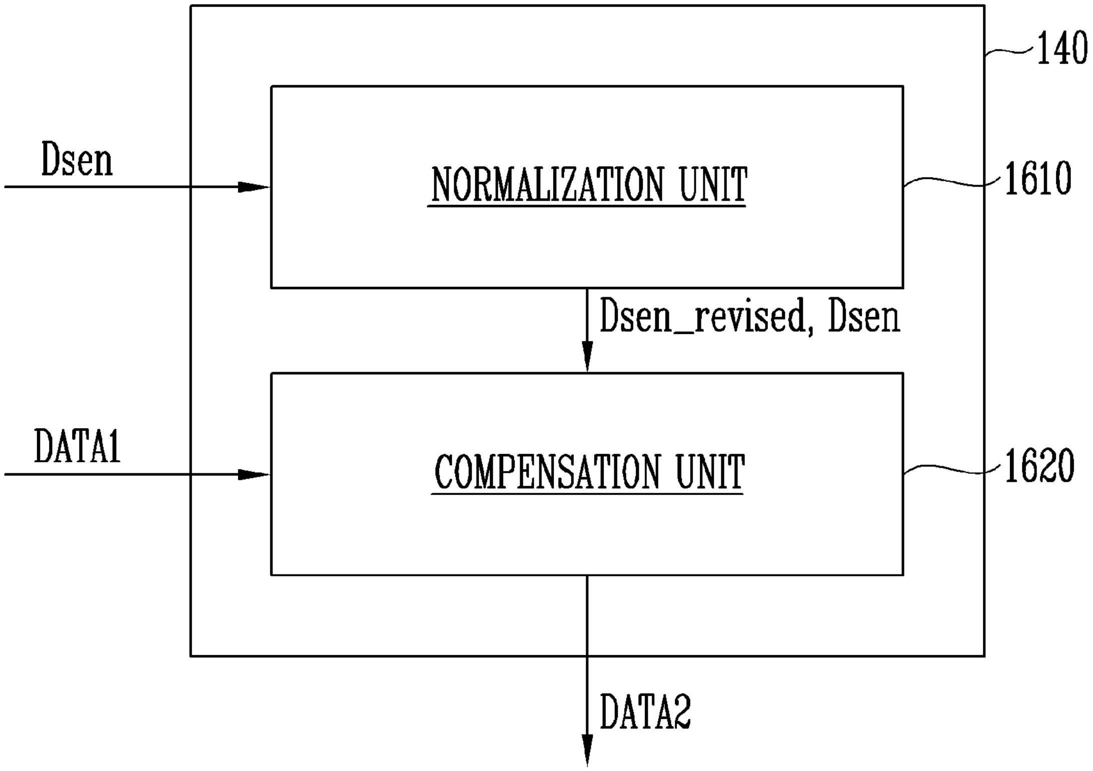
FIG. 16 is a block diagram of a timing controller according to an embodiment.

FIG. 16 is a block diagram of the timing controller 140 according to an embodiment.

Referring to FIG. 16, the timing controller 140 according to embodiments of the disclosure may include a normalization unit 1610 and a compensation unit 1620. Each of the normalization unit 1610 and the compensation unit 1620 may be implemented as a circuit (for example, an integrated circuit, a logic circuit, or the like).

The normalization unit 1610 may receive the sensing value Dsen.

Referring further to FIG. 13, the normalization unit 1610 may generate the average sensing value for each row 1360, the normalization constant for each row 1370, the correction sensing value 1380, and the like described above based on the received sensing value Dsen.

Referring further to FIG. 15, the normalization unit 1610 may perform calculating the sensing values of the first color sub-pixels positioned in the odd column (S1510), calculating the average sensing values for each row based on the sensing values of the first color sub-pixels positioned in the odd column (S1520), calculating the sensing values of the first color sub-pixels positioned in the even column (S1530), calculating the average sensing values for each row based on the sensing values of the first color sub-pixels positioned in the even column (S1540), calculating the normalization constants for each row corresponding to a difference between each of the average sensing values for each row of the first color sub-pixels positioned in the odd column and each of the average sensing values for each row of the first color sub-pixels positioned in the even column (S1550), calculating the correction sensing values obtained by correcting the sensing values of the first color sub-pixels positioned in the odd column based on the calculated normalization constants for each row (S1560), and the like.

The compensation unit 1620 may receive the first image data DATA1, the correction sensing value Dsen_revised, the sensing value Dsen, and the like. In an embodiment, the correction sensing value Dsen_revised received by the compensation unit 1620 may include the correction sensing value of the first color sub-pixels positioned in the odd column. In an embodiment, the sensing value Dsen received by the compensation unit 1620 may include the sensing value of first color sub-pixels positioned in the even column.

Referring further to FIG. 15, the compensation unit 1620 may perform calculating the compensation value based on the correction sensing values of the first color sub-pixels positioned in the odd column and the sensing values of the first color sub-pixels positioned in the even column (S1570).

The compensation unit 1620 may compensate for the received first image data DATA1 based on the correction sensing value Dsen_revised or the sensing value Dsen, and output the compensated value as the second image data DATA2.

Accordingly, effect due to the temperature may be alleviated at a time point when the sub-pixels are sensed, and reliability of compensation may be improved.

FIG. 17 is a table 1700 illustrating a normalization constant 1770 for each row, a correction sensing value 1780, a correction average sensing value 1780 for each row calculated in the first period PR1 in another embodiment.

In the table 1700, a sensing period 1710, a sensing object 1720, a row 1730, a column 1740, a sensing value 1750, an average sensing value for each row 1760, a normalization constant for each row 1770, a correction sensing value 1780, a correction average sensing value for each row 1790, a correction average sensing value for each period 1795, and the like may be included.

The sensing period 1710, the sensing object 1720, the row 1730, the column 1740, the sensing value 1750, and the average sensing value for each row 1760 are the same as the sensing period 1110, the sensing object 1120, the row 1330, the column 1340, the sensing value 1150, and the average sensing value for each row 1160, respectively, described above in FIG. 11.

The normalization constant 1770 for each row may be a value calculated from the average sensing values 1760 for each row. For example, the normalization constant 1770 for each row may be calculated by subtracting a predetermined (for example, pre-stored) average sensing value for each row of red sub-pixels from the average sensing value for each row of the red sub-pixels positioned in the odd column of the first row. In the above case, the normalization constant for each row of the first row of the red sub-pixels positioned in the odd column may be calculated as "AVGr_odd_1−AVGr_pre_1". Similarly, the normalization constant for the second row may be calculated as "AVGr_odd_2−AVGr_pre_2". Accordingly, the normalization constant for each row may be calculated for each row.

For example, the pre-stored average sensing value for each row of the sub-pixels may be measured and pre-stored after a time corresponding to the convergence point CVP of FIG. 10. However, embodiments of the disclosure are not limited thereto.

The correction sensing value 1780 may indicate individual correction sensing values Dsen_revised of sub-pixels positioned in a corresponding area. The correction sensing value Dsen_revised may be calculated by subtracting the normalization constant for each row of the corresponding row from the sensing value Dsen. For example, the correction sensing value of the red sub-pixel positioned in the first row and the first column may be calculated as "Dsen_r_1_1−(AVGr_odd_1−AVGr_pre_1)". The correction sensing value of the red sub-pixel positioned in the first row and the third column may be calculated as "Dsen_r_1_3−(AVGr_odd_1−AVGr_pre_1)". The correction sensing value of the red sub-pixel positioned in the first row and the (n−1)-th column may be calculated as "Dsen_r_1_n−1−(AVGr_odd_1−AVGr_pre_1)".

The correction average sensing value for each row 1790 may indicate a value obtained by calculating an average of the correction sensing value 1780 in a row unit. According to this, the correction average sensing value for each row of the sub-pixels positioned in the first row among the red sub-pixels positioned in the odd column may be "AVGr_pre_1". This is the same as the pre-stored average sensing value for each row of the sub-pixels.

In an embodiment of FIG. 17, the correction sensing value 1780 may be calculated with respect to both of the sub-pixels positioned in the odd column and the sub-pixels positioned in the even column. On the other hand, in the embodiment of FIG. 13 described above, the correction sensing value 1480 may be calculated only with respect to the sub-pixels positioned in the odd column, and the correction sensing value 1480 may not be calculated with respect to the sub-pixels positioned in the even column.

The correction average sensing value 1795 for each period may indicate an average sensing value of the correction average sensing value for each row 1790 during a corresponding period. Referring to FIG. 17, the correction average sensing value for each period of the first period PR1 may be calculated by adding all of "AVGr_pre_1", "AVGr_pre_2", and the like, and dividing a value obtained by the addition by m which is the number of rows. According to this, the correction average sensing value for each period of the first period PR1 may be "AVGr_pre". Similarly, the correction average sensing value 1795 for each period may be calculated in the same method with respect to the red sub-pixels positioned in the even column, and a value thereof may be the same) as "AVGr_pre". According to this, a difference in the sensing value due to the temperature may be substantially eliminated with respect to the red sub-pixels positioned in the odd column and the red sub-pixels positioned in the even column.

Figure 18:
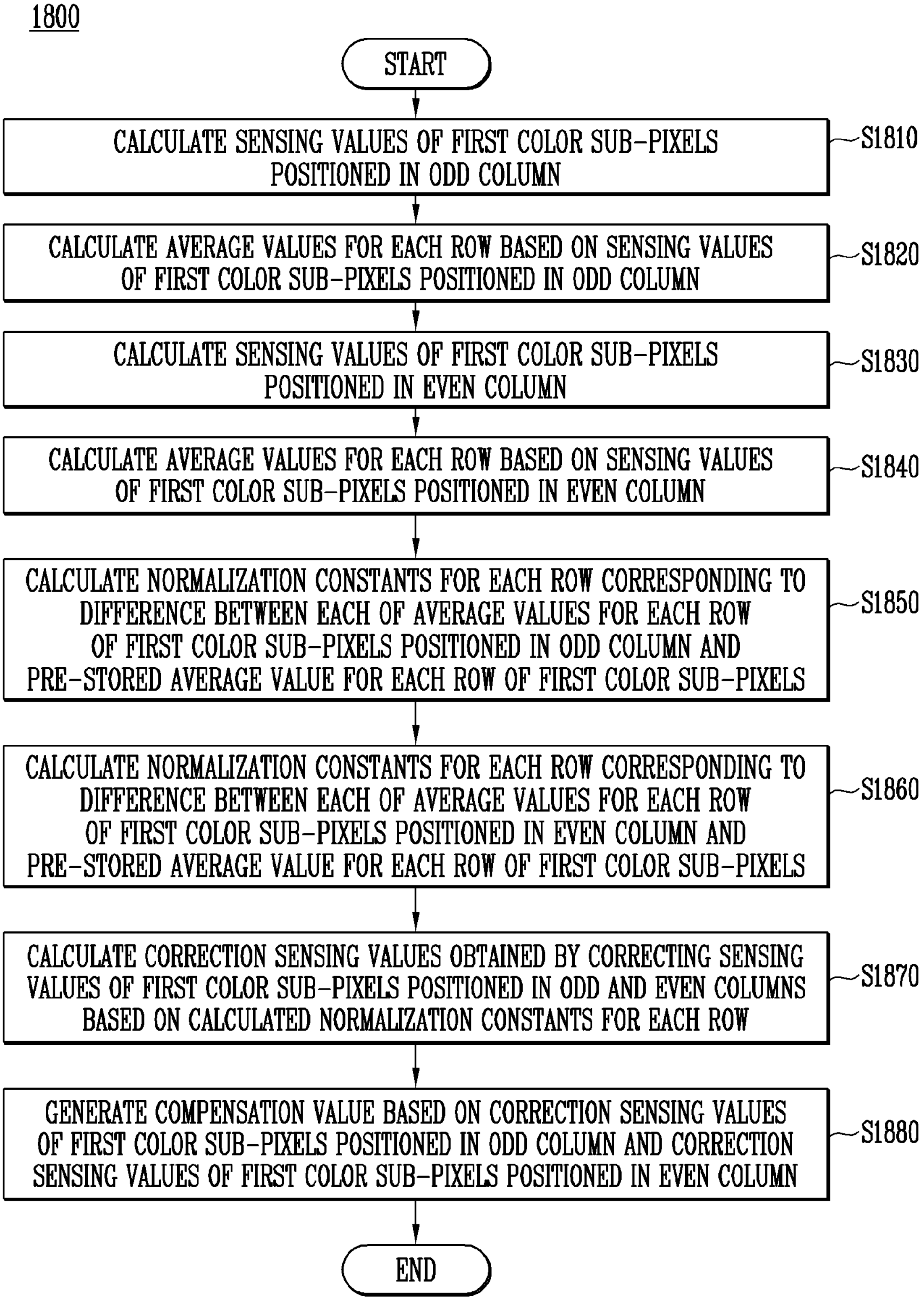
FIG. 18 is a flowchart illustrating a method of sensing and compensating for first color sub-pixels in another embodiment.

FIG. 18 is a flowchart illustrating a method 1800 of sensing and compensating for first color sub-pixels in another embodiment.

Referring to FIG. 18, the method 1800 of sensing and compensating for the first color sub-pixels may include calculating the sensing value of the first color sub-pixels positioned in the odd column (S1810), calculating the average sensing values for each row based on the sensing values of the first color sub-pixels positioned in the odd column (S1820), calculating the sensing values of the first color sub-pixels positioned in the even column (S1830), calculating the average sensing values for each row based on the sensing values of the first color sub-pixels positioned in the even column (S1840), calculating the normalization constants for each row corresponding to a difference between each of the average sensing values for each row of the first color sub-pixels positioned in the odd column and the pre-stored average sensing value for each row of the first color sub-pixels (S1850), calculating the normalization constants for each row corresponding to a difference between each of the average sensing values for each row of the first color sub-pixels positioned in the even column and the pre-stored average sensing value for each row of the first color sub-pixels (S1860), calculating the correction sensing values obtained by correcting the sensing values of the first color sub-pixels positioned in the odd and even columns based on the calculated normalization constants for each row (S1870), calculating the compensation value based on the correction sensing values of the first color sub-pixels positioned in the odd column and the correction sensing values of the first color sub-pixels positioned in the even column (S1880), and the like.

Figure 19:
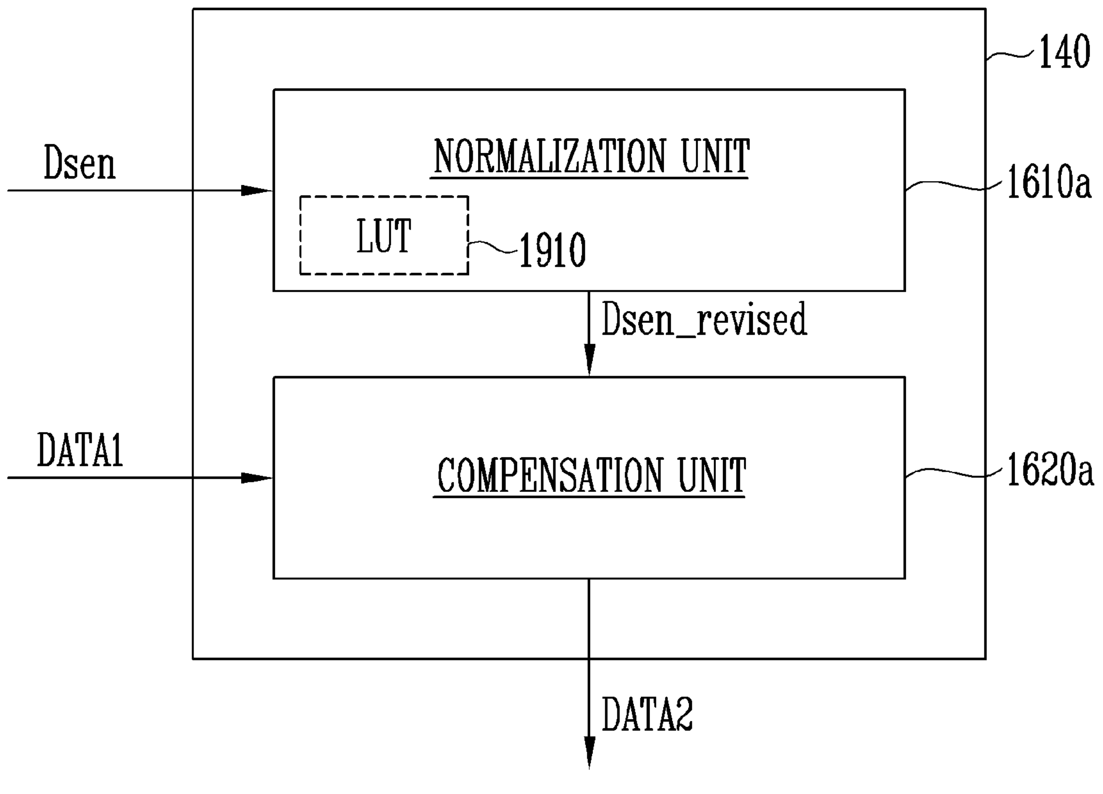
FIG. 19 is a block diagram of a timing controller according to another embodiment.

FIG. 19 is a block diagram of the timing controller 140 according to another embodiment.

Referring to FIG. 19, the timing controller 140 according to embodiments of the disclosure may include a normalization unit 1610*a* and a compensation unit 1620*a*.

The normalization unit 1610*a* may include a memory 1910. A lookup table LUT or a table LUT may be stored in the memory 1910. In an embodiment, in the lookup table LUT, the average sensing value for each row of the first color sub-pixels, the average sensing value for each row of the second color sub-pixels, and the average sensing value for each row of the third color sub-pixels may be stored. The normalization unit 1610*a* may receive the sensing value Dsen and generate the correction sensing value Dsen_revised by referring to the value stored in the memory 1910. The lookup table LUT may include at least one of the tables 1100, 1200, 1300, and 1700 described with reference to FIGS. 11 to 13, 17, and the like.

Referring further to FIG. 17, the normalization unit 1610*a* may generate the average sensing value for each row 1760, the normalization constant for each row 1770, the correction sensing value 1780, and the like described above based on the received sensing value Dsen.

Referring further to FIG. 18, the normalization unit 1610*a* may perform calculating the sensing value of the first color sub-pixels positioned in the odd column (S1810), calculating the average sensing values for each row based on the sensing values of the first color sub-pixels positioned in the odd column (S1820), calculating the sensing values of the first color sub-pixels positioned in the even column (S1830), calculating the average sensing values for each row based on the sensing values of the first color sub-pixels positioned in the even column (S1840), calculating the normalization constants for each row corresponding to a difference between each of the average sensing values for each row of the first color sub-pixels positioned in the odd column and the pre-stored average sensing value for each row of the first color sub-pixels (S1850), calculating the normalization constants for each row corresponding to a difference between each of the average sensing values for each row of the first color sub-pixels positioned in the even column and the pre-stored average sensing value for each row of the first color sub-pixels (S1860), calculating the correction sensing values obtained by correcting the sensing values of the first color sub-pixels positioned in the odd and even columns based on the calculated normalization constants for each row (S1870), and the like.

The compensation unit 1620*a* may receive the first image data DATA1, the correction sensing value Dsen_revised, and the like. In an embodiment, the correction sensing value Dsen_revised received by the compensation unit 1620*a* may include the correction sensing value of the first color sub-pixels positioned in the odd column. In an embodiment, the correction sensing value Dsen_revised received by the compensation unit 1620*a* may include the correction sensing value of first color sub-pixels positioned in the even column.

Referring further to FIG. 18, the compensation unit 1620*a* may perform calculating the compensation value based on the correction sensing values of the first color sub-pixels positioned in the odd column and the correction sensing values of the first color sub-pixels positioned in the even column (S1880).

The compensation unit 1620*a* may compensate for the received first image data DATA1 based on the correction sensing value Dsen_revised, and output the compensated value as the second image data DATA2.

Accordingly, effect due to the temperature may be alleviated at a time point when the sub-pixels are sensed, and reliability of compensation may be improved.

Figure 20:
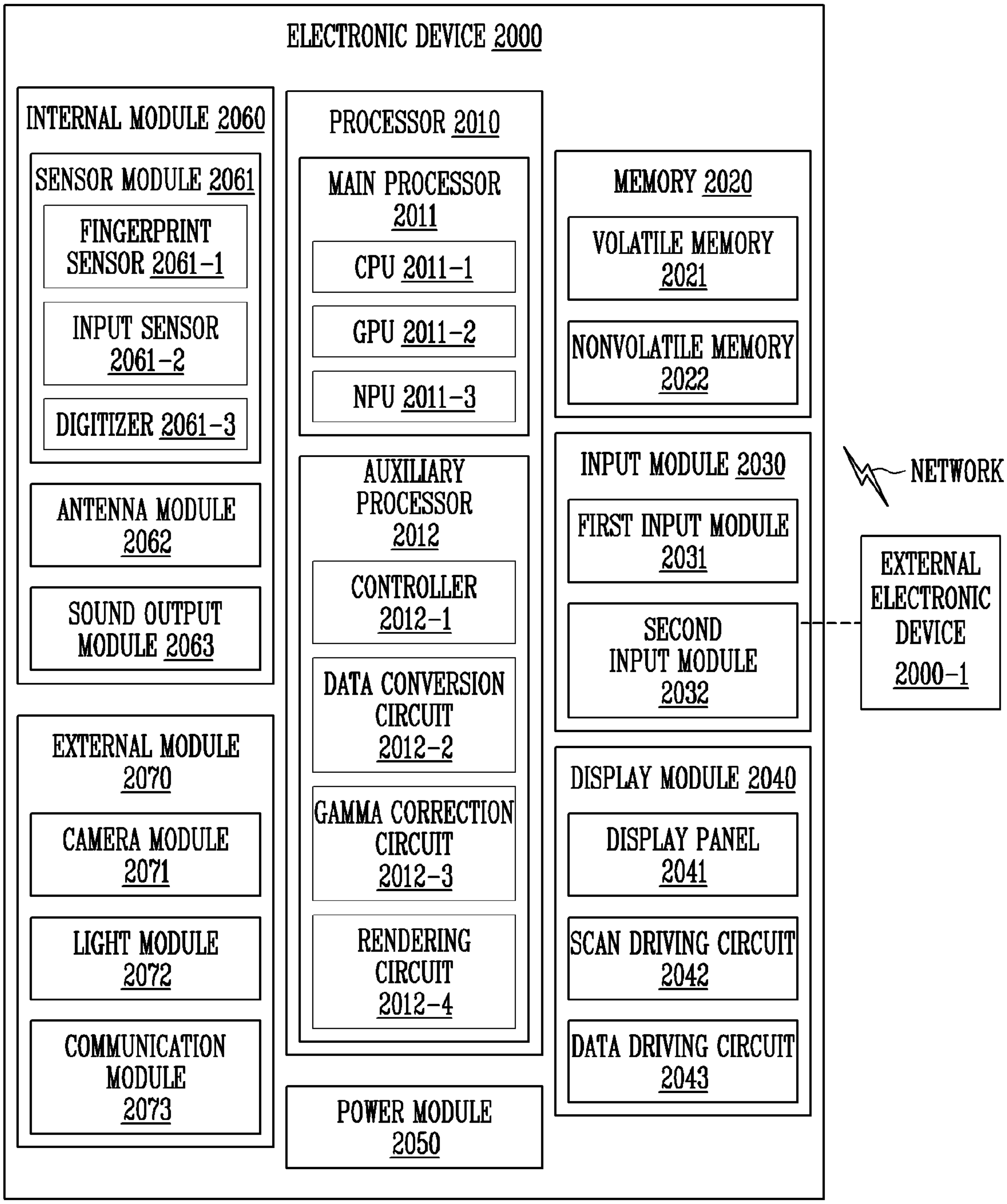
FIG. 20 is a block diagram of an electronic device according to embodiments of the disclosure.

FIG. 20 is a block diagram of an electronic device 2000 according to embodiments of the disclosure.

The electronic device 2000 described with reference to FIG. 20 may include the electronic device DS (refer to FIG. 1) described above.

The electronic device 2000 may output various pieces of information through a display module 2040 in an operating system. When the processor 2010 executes an application stored in the memory 2020, the display module 2040 may provide application information to a user of the electronic device 2000 through a display panel 2041.

As another example, when personal information authentication is executed in the display module 2040, a fingerprint sensor 2061-1 may obtain input fingerprint information as input data. The processor 2010 may compare input data obtained through the fingerprint sensor 2061-1 with authentication data stored in the memory 2020 and execute an application according to a comparison result. The display module 2040 may display information executed according to a logic of the application through the display panel 2041.

As still another example, when a music streaming icon displayed on the display module 2040 is selected, the processor 2010 may obtain a user input through an input sensor 2061-2 and activate a music streaming application stored in the memory 2020. When a music execution command is input in the music streaming application, the processor 2010 may activate a sound output module 2063 to provide sound information corresponding to the music execution command to the user.

In the above, an operation of the electronic device 2000 is briefly described. Hereinafter, a configuration of the electronic device 2000 is described in more detail. Some of configurations of the electronic device 2000 to be described later may be integrated and provided as one configuration, and one configuration may be separated into two or more configurations and provided.

Referring to FIG. 20, the electronic device 2000 may communicate with an external electronic device 2000-1 through a network (for example, a short-range wireless communication network or a long-range wireless network). According to an embodiment, the electronic device 2000 may include a processor 2010, a memory 2020, an input module 2030, a display module 2040, a power module 2050, an internal module 2060, an external module 2070, and the like. According to an embodiment, in the electronic device 2000, at least one of the above-described components may be omitted or one or more other components may be added. According to an embodiment, some of the above-described components (for example, the sensor module 2061, an antenna module 2062, the sound output module 2063, and the like) may be integrated into another component (for example, the display module 2040).

The processor 2010 may execute software to control at least another component (for example, a hardware or software component) of the electronic device 2000 connected to the processor 2010, and perform various data processing or operations. According to an embodiment, as at least a portion of the data processing or operation, the processor 2010 may store a command or data received from another component (for example, the input module 2030, the sensor module 2061, or a communication module 2073) in a volatile memory 2021 and process the command or the data stored in the volatile memory 2021. The processed result data may be stored in a nonvolatile memory 2022.

The processor 2010 may include a main processor 2011 and an auxiliary processor 2012. The main processor 2011 may include at least one of a central processing unit ("CPU") 2011-1 or an application processor ("AP"). The main processor 2011 may further include one or more of a graphic processing unit ("GPU") 2011-2, a communication processor ("CP"), and an image signal processor ("ISP"). The main processor 2011 may further include a neural processing unit ("NPU") 2011-3. The NPU 2011-3 is a processor specialized in processing an artificial intelligence model, and the artificial intelligence model may be generated through machine learning. The artificial intelligence model may include a plurality of artificial neural network layers. The artificial neural network may be a deep neural network ("DNN"), a convolutional neural network ("CNN"), a deep belief network ("DBN"), a bidirectional recurrent deep neural network ("BRDNN"), a deep Q-network, or a combination of two or more of the above. However, embodiments of the disclosure are not limited to that described above. Additionally or alternatively, the artificial intelligence model may include a software structure in addition to a hardware structure. At least two of the above-described processing units and processors may be implemented as one integrated configuration (for example, a single chip), or each may be configured as an independent configuration (for example, a plurality of chips). The main processor 2011 may include the host 160 (refer to FIG. 1) described above.

The auxiliary processor 2012 may include a controller 2012-1. The controller 2012-1 may include an interface conversion circuit and the timing controller 140 (refer to FIG. 1). The controller 2012-1 may receive an image signal from the main processor 2011, convert a data format of the image signal to correspond to an interface specification with the display module 2040, and output image data. The controller 2012-1 may output various control signals required for driving the display module 2040.

The auxiliary processor 2012 may further include a data conversion circuit 2012-2, a gamma correction circuit 2012-3, a rendering circuit 2012-4, and the like.

The data conversion circuit 2012-2 may receive the image data from the controller 2012-1, compensate the image data to display an image with a desired luminance according to a characteristic of the electronic device 2000, a setting of the user, or the like, or convert the image data for reduction of power consumption, afterimage compensation, or the like. In an embodiment, the normalization unit 1610 (refer to FIG. 16) or 1610*a* (refer to FIG. 16) and the compensation unit 1620 (refer to FIG. 16) or 1620*a* (refer to FIG. 19) may be included in the data conversion circuit 2012-2.

The gamma correction circuit 2012-3 may convert the image data, a gamma reference voltage, or the like so that the image displayed on the electronic device 2000 has a desired gamma characteristic. The rendering circuit 2012-4 may receive the image data from the controller 2012-1 and render the image data in consideration of a pixel disposition or the like of the display panel 2041 applied to the electronic device 2000. At least one of the data conversion circuit 2012-2, the gamma correction circuit 2012-3, and the rendering circuit 2012-4 may be integrated into another component (for example, the main processor 2011 or the controller 2012-1). At least one of the data conversion circuit 2012-2, the gamma correction circuit 2012-3, and the rendering circuit 2012-4 may be integrated into a data driving circuit 2043 to be described later.

The memory 2020 may store various data used by at least one component (for example, the processor 2010 or the sensor module 2061) of the electronic device 2000, and input data or output data for a command related thereto. The memory 2020 may include at least one of the volatile memory 2021 and the nonvolatile memory 2022. The memory 2020 may include the memory 1910 (refer to FIG. 19) described above.

The input module 2030 may receive a command or data to be used by a component (for example, the processor 2010, the sensor module 2061, the sound output module 2063, or the like) of the electronic device 2000 from an outside (for example, the user or the external electronic device 2000-1) of the electronic device 1000.

The input module 2030 may include a first input module 2031 configured to receive a command or data input from the user and a second input module 2032 configured to receive a command or data input from the external electronic device 2000-1. The first input module 2031 may include at least one of a microphone, a mouse, a keyboard, a key (for example, a button or the like), and a pen (for example, a passive pen or an active pen). The second input module 2032 may support a designated protocol capable of connecting to the external electronic device 2000 by wire or wirelessly. According to an embodiment, the second input module 2032 may include at least one of a high-definition multimedia interface ("HDMI"), a universal serial bus ("USB") interface, a secure digital ("SD") card interface, and an audio interface. The second input module 2032 may include a connector capable of physically connecting the electronic device 2000 to the external electronic device 2000-1, for example, an HDMI connector, a USB connector, an SD card connector, an audio connector (for example, a headphone connector), or the like.

The display module 2040 may visually provide information to the user of the electronic device 2000. The display module 2040 may include a display panel 2041, a scan driving circuit 2042, and the data driving circuit 2043. The display module 2040 may further include a window, a chassis, a bracket, and the like for protecting the display panel 2040.

The display panel 2041 may include a liquid crystal display panel, an organic light emitting display panel, an inorganic light emitting display panel, or the like. A type of the display panel 2040 is not particularly limited. The display panel 2041 may be a rigid type. The display panel 2041 may be a flexible type that may be rolled, folded, or stretchable. The display module 2040 may further include a supporter that supports the display panel 2041, a bracket, a heat dissipation member, or the like. The display panel 2041 may correspond to the display panel 110 (refer to FIG. 1) described above.

In an embodiment, the scan driving circuit 2042 may be mounted on the display panel 2041 as a driving chip. In another embodiment, the scan driving circuit 2042 may be integrated into the display panel 2041. For example, the scan driving circuit 2042 may include an amorphous silicon thin film transistor ("TFT") gate driver circuit ("ASG"), a low temperature polycrystalline silicon ("LTPS") TFT gate driver circuit, an oxide semiconductor TFT gate driver circuit ("OSG"), or the like built in the display panel 2041. The scan driving circuit 2042 may receive a control signal from the controller 2012-1 and output a scan signal to the display panel 2041 in response to the control signal. The scan driving circuit 2042 may correspond to the scan driving circuit 130 (refer to FIG. 1).

In an embodiment, the display module 2040 may further include an emission driving circuit. The emission driving circuit may output an emission control signal to the display panel 2041 in response to a control signal received from the controller 2012-1. The emission driving circuit may be distinguished from the scan driving circuit 2042, or may be integrated into the scan driving circuit 2042.

The data driving circuit 2043 may receive a control signal from the controller 2012-1 and convert image data into an analog voltage (for example, a data voltage) in response to the received control signal. The data driving circuit 2043 may output the converted data voltage to the display panel 2041. The data driving circuit 2043 may receive the control signal from the controller 2012-1 and sense sub-pixels disposed in the display panel 2041 in response to the received control signal. The data driving circuit 2043 may sense sub-pixels and output digital values corresponding to the sensing values obtained. The data driving circuit 2043 may correspond to the data driving circuit 120 (refer to FIG. 1) described above.

The data driving circuit 2043 may be integrated with another component (for example, the controller 2012-1) of the electronic device 2000. An interface conversion circuit of the controller 2012-1 and at least a portion of a function of the timing controller 140 (refer to FIG. 1) may be integrated into the data driving circuit 2043.

The display module 2040 may further include a power supply circuit. The power supply circuit may output various voltages required to drive the display panel 2041. For example, the power supply circuit may correspond to the power supply circuit 150 (refer to FIG. 1) described above.

The power module 2050 may supply power to a component of the electronic device 2000. The power module 2050 may include a battery that charges a power voltage. The battery may include a non-rechargeable primary cell, and a rechargeable secondary cell or fuel cell. The power module 2050 may include a power management integrated circuit ("PMIC"). The PMIC may supply optimized power to each of the above-described module and a module to be described later. The power module 2050 may include a wireless power transmission/reception member electrically connected to the battery. The wireless power transmission/reception member may include a plurality of antenna radiators of a coil form.

The electronic device 2000 may include an internal module 2060 and an external module 2070. The internal module 2060 may include a sensor module 2061, an antenna module 2062, and the sound output module 2063. The external module 2070 may include a camera module 2071, a light module 2072, and the communication module 2073.

The sensor module 2061 may sense an input by a body of the user or an input by a pen among the first input module 2031. The sensor module 2061 may generate an electrical signal or a data value corresponding to the input. The sensor module 2061 may include at least one of a fingerprint sensor 2061-1, an input sensor 2061-2, and a digitizer 2061-3.

The fingerprint sensor 2061-1 may generate a data value corresponding to a user's fingerprint. In an embodiment, the fingerprint sensor 2061-1 may include one of an optical type, capacitive type, and ultrasonic type fingerprint sensors. However, embodiments of the disclosure are not limited thereto.

The input sensor 2061-2 may generate a data value corresponding to coordinate information of the input by the body of the user or the pen. The input sensor 2061-2 may generate a change amount of a capacitance by the input as the data value. The input sensor 2061-2 may sense an input by the passive pen or may transmit/receive data to and from the active pen.

The input sensor 2061-2 may measure a biometric signal such as blood pressure, water, or body fat. For example, when the user touches a sensor layer or a sensing panel with a body part and does not move during a certain time, the input sensor 2061-2 may sense the biometric signal based on a change of an electric field by the body part. Accordingly, information on the sensed biometric signal desired by the user may be output to the display module 2040.

The digitizer 2061-3 may generate a data value corresponding to coordinate information of the input by the pen. The digitizer 2061-3 may generate an electromagnetic change amount by the input as the data value. The digitizer 2061-3 may sense the input by the passive pen or may transmit/receive data to and from the active pen.

In an embodiment, at least one of the fingerprint sensor 2061-1, the input sensor 2061-2, and the digitizer 2061-3 may be implemented as the sensor layer formed on the display panel 2041 through a continuous steps. At least one of the fingerprint sensor 2061-1, the input sensor 2061-2, and the digitizer 2061-3 may be disposed above the display panel 2041. One (for example, the digitizer 2061-3) of the fingerprint sensor 2061-1, the input sensor 2061-2, and the digitizer 2061-3 may be disposed below the display panel 2041.

At least two of the fingerprint sensor 2061-1, the input sensor 2061-2, and the digitizer 2061-3 may be formed to be integrated into one sensing panel through the same process. In an embodiment, when at least two of the fingerprint sensor 2061-1, the input sensor 2061-2, and the digitizer 2061-3 are integrated into one sensing panel, the sensing panel may be disposed between the display panel 2041 and a window disposed above the display panel 2041. However, embodiments of the disclosure are not limited thereto. The sensing panel may be disposed on the window, and a position of the sensing panel is not particularly limited.

At least one of the fingerprint sensor 2061-1, the input sensor 2061-2, and the digitizer 2061-3 may be embedded in the display panel 2041. At least one of the fingerprint sensor 2061-1, the input sensor 2061-2, and the digitizer 2061-3 may be simultaneously formed through a process of forming elements (for example, a light emitting element, a transistor, a capacitor, and the like) included in the display panel 2041.

In addition, the sensor module 2061 may generate an electrical signal or a data value corresponding to an internal state or an external state of the electronic device 2000. The sensor module 2061 may further include, for example, at least one of a gesture sensor, a gyro sensor, a barometric pressure sensor, a magnetic sensor, an acceleration sensor, a grip sensor, a proximity sensor, a color sensor, an infrared ("IR") sensor, a biometric sensor, a temperature sensor, a humidity sensor, and an illuminance sensor.

The antenna module 2062 may include one or more antennas for transmitting a signal or power to an outside or receiving a signal or power. According to an embodiment, the communication module 2062 may transmit a signal to an external electronic device or receive a signal from the external electronic device 2000-1 or receive a signal from the external electronic device 2000-1 through an antenna suitable for a communication method. An antenna pattern of the antenna module 2062 may be integrated into one configuration (for example, the display panel 2041) of the display module 2040, the input sensor 2061-2, or the like.

The sound output module 2063 may be configured to output a sound signal to an outside of the electronic device 2000. For example, the sound output module 2063 may include a speaker used for general purposes such as multimedia playback or recording playback, and a receiver used exclusively for receiving a call. According to an embodiment, the receiver may be formed integrally with or separately from the speaker. A sound output pattern of the sound output module 2063 may be integrated into the display module 2040.

The camera module 2071 may capture a still image and a moving image. According to an embodiment, the camera module 2071 may include one or more lenses, an image sensor, or an image signal processor. The camera module 2071 may further include an infrared camera capable of measuring presence or absence of the user, a position of the user, a gaze of the user, or the like.

The light module 2072 may provide light. The light module 2072 may include a light emitting diode or a xenon (Xe) lamp. The light module 2072 may operate in conjunction with the camera module 2071 or may operate independently.

The communication module 2073 may support establishment of a wired or wireless communication channel between the electronic device 2000 and the external electronic device 2000-1, and performance of communication through the established communication channel. In an embodiment, communication module 2073 may include a wireless communication module and/or a wired communication module. The wireless communication module may include, for example, a cellular communication module, a short-range communication module, a global navigation satellite system ("GNSS") communication module, or the like. The wired communication module may include, for example, a local area network ("LAN") communication module, a power line communication module, or the like. The communication module 2073 may communicate with the external electronic device 2000-1 through a short-range communication network or a long-range communication network. The short-range communication network may include, for example, Bluetooth®, wireless fidelity ("Wi-Fi") direct, infrared data association ("IrDA"), or the like. The long-range communication network may include a computer network such as a LAN or wide area network ("WAN"). The communication module 2073 described above may be implemented as one chip, or may be implemented as separate chips.

The input module 2030, the sensor module 2061, the camera module 2071, and the like may be used to control an operation of the display module 2040 in conjunction with the processor 2010.

The processor 2010 may output a command or data to the display module 2040, the sound output module 2063, the camera module 2071, or the light module 2072 based on input data received from the input module 2030. For example, the processor 2010 may generate image data in response to the input data applied through a mouse, an active pen, or the like and output the image data to the display module 2040, or generate command data in response to the input data and output the command data to the camera module 2071 or the light module 2072. When the input data is not received from the input module 2030 during a certain time, the processor 2010 may convert an operation mode of the electronic device 2000 to a low power mode or a sleep mode to reduce power consumed in the electronic device 2000.

The processor 2010 may output a command or data to the display module 2040, the sound output module 2063, the camera module 2071, or the light module 2072 based on sensing data received from the sensor module 2061. For example, the processor 2010 may compare authentication data applied by the fingerprint sensor 2061-1 with authentication data stored in the memory 2020 and then execute an application according to a comparison result. The processor 2010 may execute the command based on sensing data sensed by the input sensor 2061-2 or the digitizer 2061-3 or output corresponding image data to the display module 2040. When the sensor module 2061 includes a temperature sensor, the processor 2010 may receive temperature data for a measured temperature from the sensor module 2061 and further perform luminance correction or the like on the image data based on the temperature data.

The processor 2010 may receive measurement data for the presence of the user, the position of the user, the gaze of the user, and the like, from the camera module 2071. The processor 2010 may further perform luminance correction or the like on the image data based on the measurement data. For example, the processor 2010 determining the presence or absence of the user through an input from the camera module 2071 may output image data of which a luminance is corrected through the data conversion circuit 2012-2 or the gamma correction circuit 2012-3 to the display module 2040.

Some of the components of the electronic device 2000 may be connected to each other through a communication method between peripheral devices, for example, a bus, general purpose input/output ("GPIO"), a serial peripheral interface ("SPI"), a mobile industry processor interface ("MIPI"), or an ultra path interconnect ("UPI") link to exchange a signal (for example, a command or data) with each other. For example, the processor 1110 may communicate with the display module 2040 through a mutually agreed interface. To this end, one of the above-described communication methods may be adopted, but the communication method is not limited to that described above.

The electronic device 2000 according to embodiments of the disclosure may be various types of devices. For example, the electronic device 2000 may include at least one of a portable communication device (for example, a smart phone), a computer device, a portable multimedia device, a portable medical device, a camera, a wearable device, and a home appliance. However, the electronic device 2000 according to embodiments of the disclosure is not limited thereto.

According to a display device, an electronic device including the same, and a method of driving the same according to embodiments of the disclosure, reliability may be improved by reducing an effect of sensing and compensation due to a temperature change.

The drawings referred to so far and the detailed description of the disclosure described herein are merely examples of the disclosure, are used for merely describing the disclosure, and are not intended to limit the meaning and the scope of the disclosure described in claims. Therefore, those skilled in the art will understand that various modifications and equivalent other embodiments are possible from these. Thus, the true scope of the disclosure should be determined by the technical spirit of the appended claims.

What is claimed is:

1. A display device comprising:

a display panel where a plurality of sub-pixels and a plurality of reference voltage lines connected to the plurality of sub-pixels are disposed;

a data driving circuit connected to the plurality of reference voltage lines, configured to sense a first sub-pixel among the plurality of sub-pixels in a first period, and configured to sense a second sub-pixel among the plurality of sub-pixels in a second period after the first period; and a timing controller configured to correct a sensing value obtained by sensing the first sub-pixel based on a sensing value obtained by sensing the second sub-pixel.

2. The display device according to claim 1, wherein a temperature of the display panel at a time point when the second sub-pixel is sensed is lower than a temperature of the display panel at a time point when the first sub-pixel is sensed.

3. The display device according to claim 1, wherein the first sub-pixel is positioned in a first column, the second sub-pixel is positioned in a second column different from the first column, and the first sub-pixel and the second sub-pixel are included in a plurality of first color sub-pixels, and are positioned in a same row.

4. The display device according to claim 3, wherein the first column is included in odd columns, the second column is included in even columns, and the timing controller is configured to calculate first average sensing values for respective rows based on first sensing values of first color sub-pixels positioned in the odd columns among the plurality of first color sub-pixels, and calculate second average sensing values for respective rows based on second sensing values of first color sub-pixels positioned in the even columns among the plurality of first color sub-pixels.

5. The display device according to claim 4, wherein the timing controller is configured to correct the first sensing values based on the second sensing values.

6. The display device according to claim 5, wherein the timing controller is configured to calculate normalization constants for respective rows, where the normalization constant for each row corresponds to a difference between the first average sensing value for each row and the second average sensing value for each row, and calculate correction sensing values obtained by correcting the first sensing values based on the calculated normalization constants.

7. The display device according to claim 6, wherein the timing controller is configured to generate a compensation value based on the correction sensing values and the second sensing values.

8. The display device according to claim 1, wherein a plurality of data lines connected to the plurality of sub-pixels are disposed in the display panel, and at least one of the plurality of sub-pixels comprises:

a light emitting element;

a first transistor connected between a first power line and a second node and including a gate electrode electrically connected to a first node;

a second transistor including a gate electrode electrically connected to a first scan line and configured to switch an electrical connection between the first node and a corresponding one of the plurality of data lines;

a third transistor including a gate electrode electrically connected to a second scan line and configured to switch an electrical connection between the second node and a corresponding one of the plurality of reference voltage lines; and a storage capacitor including one side electrode electrically connected to the first node and another side electrode electrically connected to the second node.

9. The display device according to claim 8, wherein the data driving circuit comprises:

an output circuit configured to supply a data voltage to the plurality of data lines; and a sensing circuit configured to receive an analog voltage from the plurality of reference voltage lines and convert the received analog voltage into a digital sensing value corresponding to the received analog voltage.

* * * * *